US011968658B2

(12) United States Patent
Grayson et al.

(10) Patent No.: US 11,968,658 B2
(45) Date of Patent: Apr. 23, 2024

(54) PARTITIONING RADIO RESOURCES TO ENABLE NEUTRAL HOST OPERATION FOR A RADIO ACCESS NETWORK

(71) Applicant: Cisco Technology, Inc., San Jose, CA (US)

(72) Inventors: Mark Grayson, Berkshire (GB); Humberto Jose La Roche, Ocean, NJ (US)

(73) Assignee: Cisco Technology, Inc., San Jose, CA (US)

( * ) Notice: Subject to any disclaimer, the term of this patent is extended or adjusted under 35 U.S.C. 154(b) by 162 days.

(21) Appl. No.: 17/532,495

(22) Filed: Nov. 22, 2021

(65) Prior Publication Data

US 2023/0021194 A1    Jan. 19, 2023

Related U.S. Application Data

(60) Provisional application No. 63/220,090, filed on Jul. 9, 2021.

(51) Int. Cl.
*H04W 72/12* (2023.01)
*H04W 68/02* (2009.01)
*H04W 74/0833* (2024.01)

(52) U.S. Cl.
CPC .......... *H04W 72/12* (2013.01); *H04W 68/02* (2013.01); *H04W 74/0833* (2013.01)

(58) Field of Classification Search
None
See application file for complete search history.

(56) References Cited

U.S. PATENT DOCUMENTS

| 2009/0170472 | A1* | 7/2009 | Chapin | H04W 28/18 455/410 |
| 2012/0082101 | A1* | 4/2012 | Gaal | H04W 72/1268 370/329 |
| 2019/0320452 | A1 | 10/2019 | Zhang et al. | |
| 2020/0196154 | A1 | 7/2020 | Maguire | |
| 2021/0211942 | A1 | 7/2021 | Guo et al. | |
| 2021/0234648 | A1 | 7/2021 | Parekh et al. | |

FOREIGN PATENT DOCUMENTS

WO    2021198736    10/2021

* cited by examiner

*Primary Examiner* — Alex Skripnikov
(74) *Attorney, Agent, or Firm* — Polsinelli P.C.

(57) ABSTRACT

System, methods, and computer-readable media for a Neutral Host (NH) operation of a 5G radio, whereby a NH operator receives feedback from hosts and determines to partition Physical Resource Block (PRB) resources. Thus, a NH system is provided that enables a third-party to independently operate other channels, whereby individual physical random access channels (PRACH) are operated by independent hosts. The NH system is able to indicate partitioned resources to individual hosts, including PRACH definition and mutually exclusive set of PRBs partitioned between tenants. The hosts operating in the NH system may be operable to implement their own independent schedulers, incorporating host specific logic, that can be configured with the partitioned resources but which may further operate independently of each other.

20 Claims, 14 Drawing Sheets

PARTITIONING RADIO RESOURCES TO ENABLE NEUTRAL HOST OPERATION FOR A RADIO ACCESS NETWORK

CROSS-REFERENCE TO RELATED APPLICATIONS

This application claims priority to U.S. Provisional Patent Application No. 63/220,090, filed on Jul. 9, 2021, the content of which is incorporated herein by reference in its entirety.

TECHNICAL FIELD

The present disclosure generally relates to operating a shared Open Radio Access Network (O-RAN) Radio Unit (O-RU) and, more specifically, scheduling radio transmissions across multiple operators in a shared O-RU.

BACKGROUND

Fifth-generation (5G) mobile and wireless networks will provide enhanced mobile broadband communications and are intended to deliver a wider range of services and applications as compared to all prior generation mobile and wireless networks. Compared to prior generations of mobile and wireless networks, the 5G architecture is service-based, meaning that wherever suitable, architecture elements are defined as network functions that offer their services to other network functions via common framework interfaces.

Advances in SDR (software-defined radio) have enabled an O-RU (O-RAN radio unit) to be shared between different tenant operators via additional SDR systems and methods to be defined for effective sharing. O-RAN is focused on decomposing the RAN into multiple different functions and elements and then defining one or more multi-vendor interfaces between such functions and elements. As such, in O-RAN, there can be a distributed unit associated with a first vendor that interfaces with a radio unit associated with a second vendor, as an example.

However, O-RAN has generally been conceived as operating in a single operator domain, meaning that multiple different operators do not share a single radio.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof, which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1A:
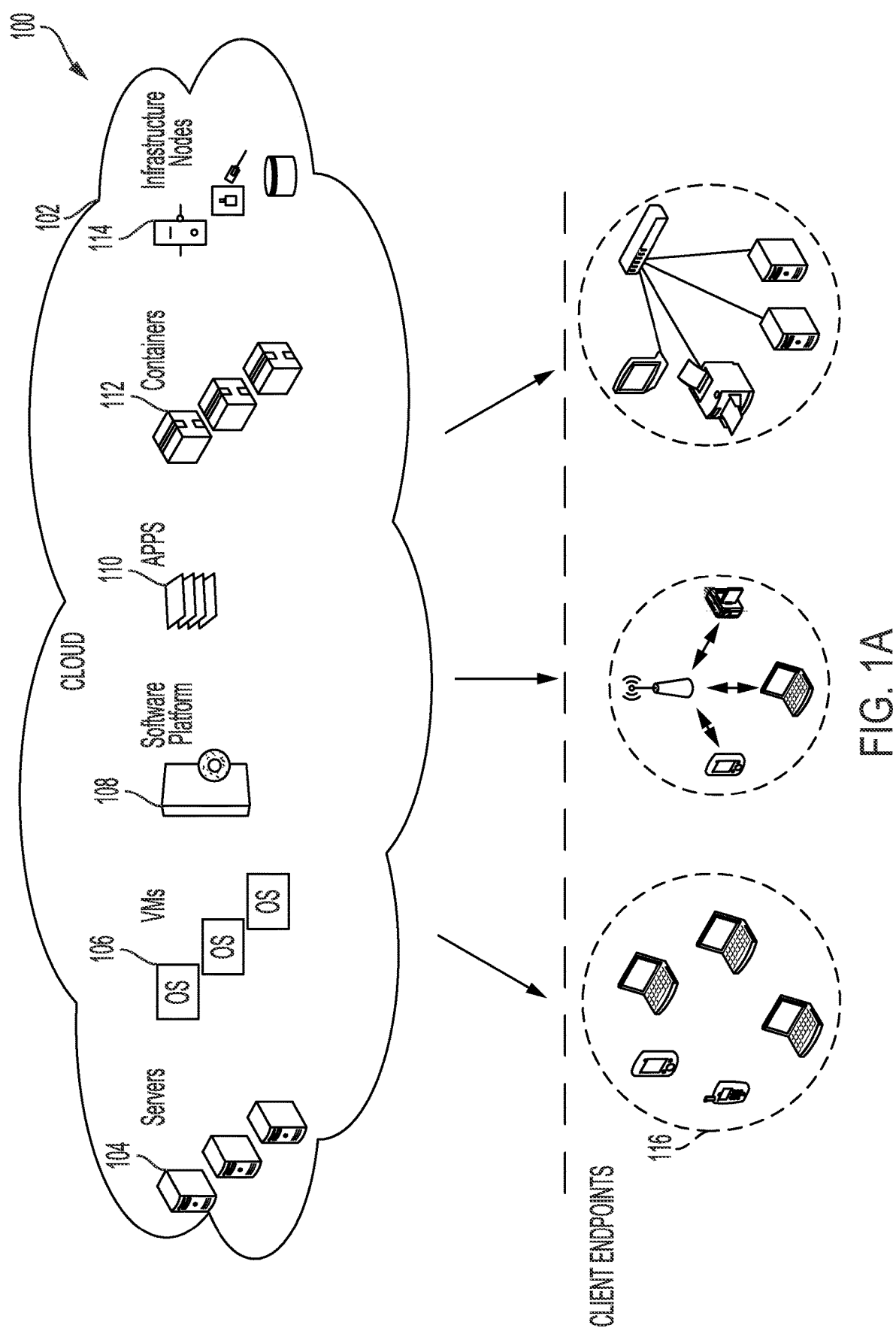
FIG. 1A illustrates an example cloud computing architecture, and in which some aspects of the present technology may operate.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form to avoid obscuring the concepts of the subject matter of this disclosure.

Overview

Disclosed are systems, apparatuses, methods, non-transitory computer-readable media, and circuits for committing a first partitioning configuration for a first tenant or slice operator to a shared resource configured by a shared resource operator. In some examples, the shared resource operator confirmed the first partitioning configuration is in accordance with a resource partitioning policy.

In some examples, the method may include receiving two or more sets of scheduling information from two or more respective schedulers operated by two or more respective individual tenant or slice operators, including the first tenant or slice operator. The method may further include operating a proxy scheduler that ensures the scheduling information is in accordance with an agreed-upon set of resource partitioning policies. In some examples, the method may include broadcasting messages associated with the scheduling information to user equipments (UEs).

A system can include one or more processors and at least one computer-readable storage medium storing instructions which, when executed by the one or more processors, cause the one or more processors to commit a first partitioning configuration for a first tenant or slice operator to a shared resource configured by a shared resource operator. In some examples, the shared resource operator confirmed the first partitioning configuration is in accordance with a resource partitioning policy.

The instructions may further cause the one or more processors to receive two or more sets of scheduling information from two or more respective schedulers operated by two or more respective individual tenant or slice operators, including the first tenant or slice operator. The instructions may further cause the one or more processors to operate a proxy scheduler that ensures the scheduling information is in accordance with an agreed-upon set of resource partitioning policies and broadcast messages associated with the scheduling information to UEs.

A non-transitory computer-readable storage medium having stored therein instructions which, when executed by a computing system, cause the computing system to receive two or more sets of scheduling information from two or more respective schedulers operated by two or more respective individual tenant or slice operators, including the first tenant or slice operator. In some examples, the shared resource operator confirmed that the first partitioning configuration is in accordance with a resource partitioning policy.

The instructions may further cause the computing system to receive two or more sets of scheduling information from two or more respective schedulers operated by two or more respective individual tenant or slice operators, including the first tenant or slice operator. The instructions may further cause the computing system to operate a proxy scheduler that ensures the scheduling information is in accordance with an agreed upon set of resource partitioning policies and broadcast messages associated with the scheduling information to UEs.

Description of Example Embodiments

As noted above, fifth-generation (5G) mobile and wireless networks will provide enhanced mobile broadband communications and deliver a wider range of services and applications as compared to all prior generation mobile and wireless networks. Compared to prior generations of mobile and wireless networks, the 5G architecture is service-based, meaning that wherever suitable, architecture elements are defined as network functions that offer their services to other network functions via common framework interfaces.

In O-RAN, there is a need to deploy a shared system in a couple of use cases. One is a rural economic case, wherein it does not make economic sense for a single operator to deploy their systems independently given the insufficient traffic users, such that they would not get a return on their investment. Therefore, it would be beneficial to install one radio unit, which can then be shared by multiple operators. A second use case is a more conventional shared market, in an indoor market for large properties such as a shopping mall or sports stadium of upward of 250,000 square feet, where distributed antenna systems and sometimes base stations as well, in the basement for example, are set up in a distributed system. There is a common need to deploy a single radio that can be shared between multiple different operators in both extremes.

Similarly, in both a Multi-Operator Radio Access Network (MORAN) architecture and RAN slicing, RAN resources are to be partitioned and assigned to different entities. In MORAN, resources are assigned to tenant operators sharing an entire RAN. More specifically, a scheduler used to support all entities (tenants) is common among the entities. In RAN slicing, each "slice" represents a different class of services. In a multi-operator environment, each slice needs to be managed through a different operator. When there is a need to deploy different radio stacks per slice, but each one shares a spectrum band or carrier, the question that commonly arises is how to partition the radio resources. Such a need may result from instances in which a tenant operator (e.g., for a MORAN example) or a slice operator (e.g., for a RAN slicing example) may wish to implement unique services and/or service levels that demand different attributes that a shared radio scheduler may not support.

The disclosed technology addresses the need in the art for O-RAN to partition an New Radio (NR) carrier by Physical Resource Blocks (PRBs). The present technology involves system, methods, and computer-readable media for a Neutral Host (NH) operation of a 5G radio, whereby a NH operator receives feedback from hosts and determines to partition PRB resources. Thus, a NH system enables a third party to independently operate PSS, SSB, and PBCH, whereby independent hosts operate individual common channels that may include down-link PCH channels and up-link PRACH channels. The NH system is able to indicate partitioned resources to individual hosts, including PCH and PRACH definition and a mutually exclusive set of PRBs partitioned between tenants.

Additionally, hosts operating in the NH system are operable to maintain timing synchronization during periods when PRB resources have not been allocated to enable seamless switchover between a first host and a second host. The hosts operating in the NH system may be operable to implement their own independent schedulers, incorporating host-specific logic that can be configured with the partitioned resources, but which may further operate independently of each other.

Figure 1B:
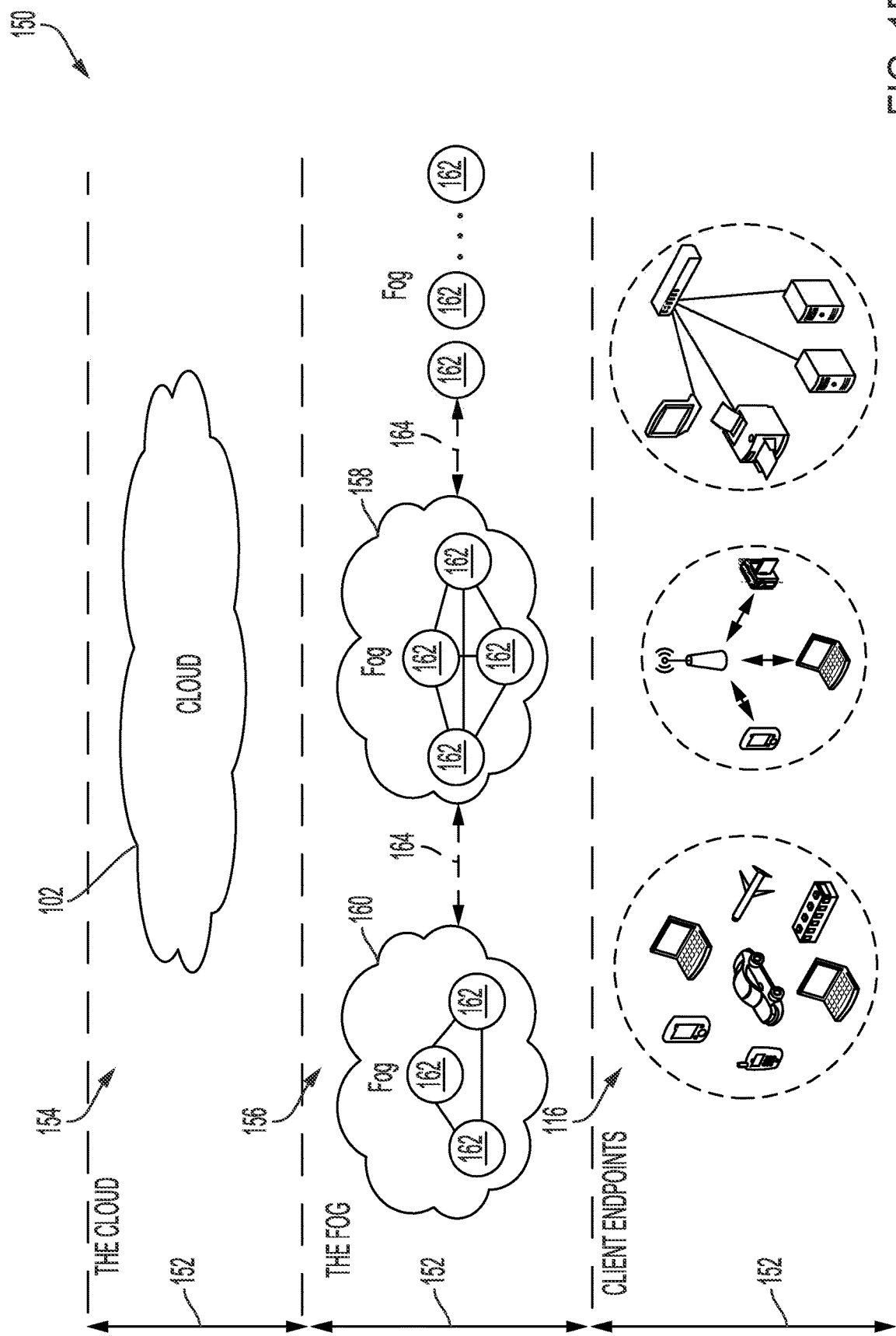
FIG. 1B illustrates an example fog computing architecture, and in which some aspects of the present technology may operate.
Figure 2:
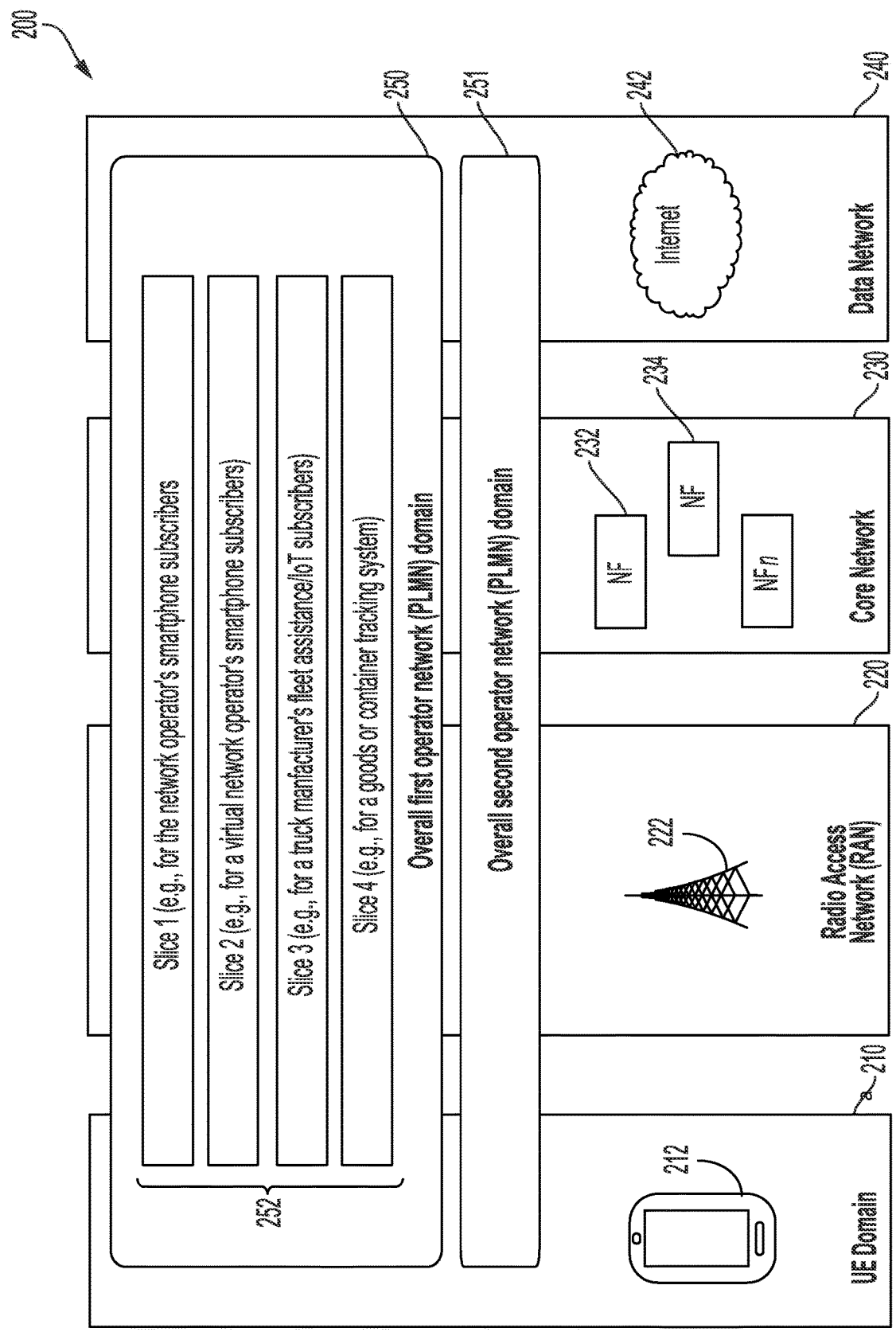
FIG. 2 depicts an example schematic representation of a 5G network environment in which network slicing has been implemented, and in which some aspects of the present technology may operate.

A description of network environments and architectures for network data access and services is illustrated in FIGS. 1A, 1B, and 2. A discussion of systems, methods, and computer-readable media for validating and committing a shared O-RU configuration via a shared O-RU Operator, as shown in FIGS. 3-6 will then follow. The discussion then concludes with a brief description of an example device, as illustrated in FIG. 7. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can form part of a IP connection or otherwise be accessed through the IP connection. Specifically, the cloud 102 can include an initiator or a receiver of an IP connection and be utilized by the initiator or the receiver to transmit and/or receive data through the IP connection. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can be used to provide various cloud computing services via the cloud elements 104-114, such as SaaSs (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates a diagram of an example fog computing architecture 150. The fog computing architecture can form part of an IP connection or otherwise be accessed through the IP connection. Specifically, the fog computing architecture can include an initiator or a receiver of a IP connection and be utilized by the initiator or the receiver to transmit and/or receive data through the IP connection. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage, and networking capabilities of traditional cloud networks but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected via links 164 in various topologies, including star, ring, mesh, or hierarchical arrangements, for example.

In some cases, one or more fog nodes 162 can be mobile fog nodes. The mobile fog nodes can move to different geographic locations, logical locations, or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

FIG. 2 depicts an example schematic representation of a 5G network environment 200 in which network slicing has been implemented, and in which one or more aspects of the present disclosure may operate. As illustrated, network environment 200 is divided into four domains, each of which will be explained in greater depth below; a User Equipment (UE) domain 210, e.g. of one or more enterprises, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, ..., n reside; and a Data Network 240, in which one or more data communication networks such as the Internet 242 reside. Additionally, the Data Network 240 can support SaaS providers configured to provide SaaSs to enterprises, e.g., users in the UE domain 210.

Core Network 230 contains a plurality of Network Functions (NFs), shown here as NF 232, NF 234 ... NF n. In some embodiments, core network 230 is a 5G core network (5GC) in accordance with one or more accepted 5GC architectures or designs. In some embodiments, core network 230 is an Evolved Packet Core (EPC) network, which combines aspects of the 5GC with existing 4G networks. Regardless of the particular design of core network 230, the plurality of NFs typically execute in a control plane of core network 230, providing a service-based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 230 can include one or more Access and Mobility Management Functions (AMF; typically used when core network 230 is a 5GC network) and Mobility Management Entities (MME; typically used when core network 230 is an EPC network), collectively referred to herein as an AMF/MME for purposes of simplicity and clarity. In some embodiments, an AMF/MME can be common to or otherwise shared by multiple slices of the plurality of network slices 252, and in some embodiments, an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 200, one or more overall operator network domains 250, 251 are defined. The operator network domain 250 is in some embodiments a Public Land Mobile Network (PLMN) and can be thought of as the carrier or business entity that provides cellular service to the end-users in UE domain 210. In other embodiments the operator domain 250 is a private Non-Public Network (NPN). Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the Radio Access Network (RAN) 120, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled decomposition of a PLMN with the specific network functions and provides services that are required for a specific usage scenario. In other embodiments, network slicing may enable a 5G network operator to deploy multiple, independent PLMNs where each is customized by instantiating only those features, capabilities and services required to satisfy a given subset of the UEs or a related business customer needs. In some embodiments, the plurality of independent PLMNs may correspond to a mix of public and non-public networks.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise. In other embodiments, the enterprise may request a host operator to instantiate a particular Non-Public Network on behalf of the enterprise. At the time of registration, the enterprise may provide a set of networking identities including ITU-T E.212 network codes to be used in its NPN.

Associating SaaSs and SaaS providers with network slices used to provide the SaaSs to enterprises can facilitate efficient management of SaaS provisioning to the enterprises. Specifically, it is desirable for an enterprise/subscriber to associate already procured SaaSs and SaaS providers with network slices actually being used to provision the SaaSs to the enterprise. However, associating SaaSs and SaaS providers with network slices is extremely difficult to achieve without federation across enterprises, network service providers, e.g. 5G service providers, and SaaS providers.

In various embodiments, a user equipment (not shown in FIG. 2) may be associated with any electronic device, machine, robot, etc. wishing to initiate a flow in a system. The terms 'device', 'electronic device', 'automation device', 'computing device', 'machine', 'robot', 'client', 'client device', and variations thereof are inclusive of devices used to initiate a communication, such as a computer, a vehicle and/or any other transportation related device having electronic devices configured thereon, an automation device, an enterprise device, an appliance, an Internet of Things (IoT) device, etc., a personal digital assistant (PDA), a laptop or electronic notebook, a desktop computer, a cellular telephone, a smart phone, an IP phone, any other device and/or combination of devices, component, element, and/or object capable of initiating voice, audio, video, media, or data exchanges within a system.

Figure 3:
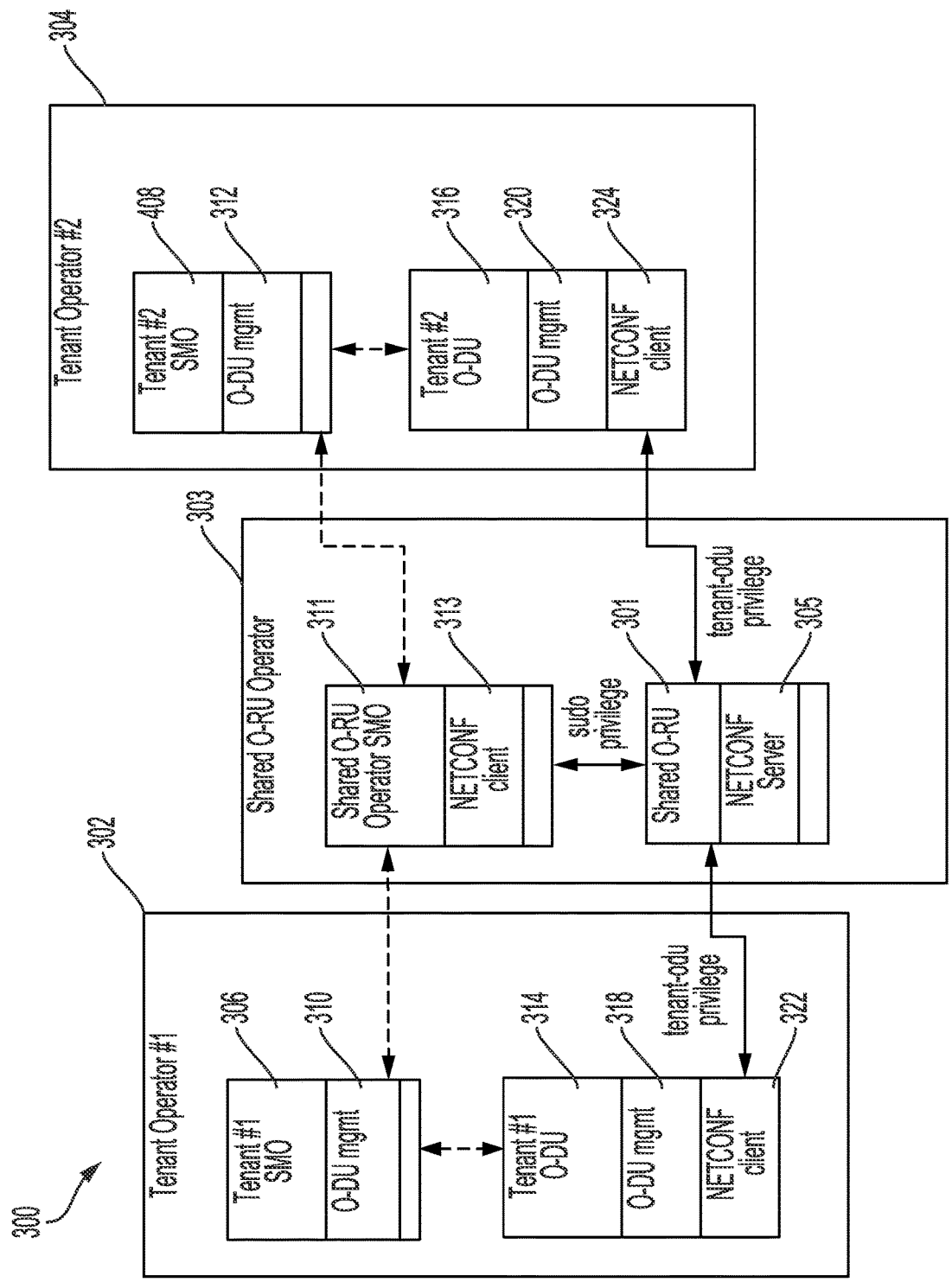
FIG. 3 is a diagram of a system in which techniques may be implemented to facilitate partitioning radio resources to enable neutral host operation for a radio access network involving an open fronthaul interface in accordance with some aspects of the present technology.

FIG. 3 is a diagram of a system in which techniques may be implemented to facilitate partitioning radio resources to enable neutral host operation for a radio access network involving an open multi-vendor interface for individual tenant or slice operators to request radio resources, according to an example embodiment. In one embodiment, the system of FIG. 3 may be implemented according to Open RAN (O-RAN or ORAN) Alliance standards.

The O-RAN Alliance is defining a neutral host architecture in which an O-RAN Radio Unit (O-RU) 301 can be shared (referred to herein as a 'shared O-RU') between different tenant operators. FIG. 3 illustrates two tenant operators (e.g., tenant operator #1 302, tenant operator #2 304) and a shared O-RU neutral host (NH) operator 303. Generally, the shared resource/neutral host operator 303 has a management role to operate the shared O-RU 301. Each tenant operator 302, 304 may be implemented as an O-RAN Distributed Unit (O-DU) and O-RAN Central Unit (O-CU) operator in at least one embodiment. Generally, each tenant operator 302, 304 implements their own O-CU and O-DU and connects it to the shared O-RU 301.

As shown in FIG. 3, each tenant operator may include a tenant SMO operators (e.g., tenant SMO operator #1 306, tenant SMO operator #2 308) including O-DU management (mgmt) logic (e.g., O-DU mgmt. 310, O-DU mgmt. 312) and a tenant O-DU operators (e.g., tenant #1)-DU #1 314, tenant #2 O-DU 316) that include O-DU management logic 318, 320 and a Network Configuration Protocol (NETCONF) client 322, 324. The shared O-RU operator (neutral host) 303 may include System or Service Management and Orchestration (SMO) function 311 including a NETCONF client 313 and a shared O-RU 301 including a NETCONF server 305. A tenant sharing agreement can be negotiated between the shared resource operator 303 and each tenant operator 302, 304, as discussed in further detail herein.

In general, a NETCONF server is a policy control point in a managed device that terminates the NETCONF protocol and manages interactions with the device's configuration management information or datastore that can be maintained at the device. In some instances, a NETCONF server can implement Access Control based on a NETCONF Access Control Model (NACM) as prescribed at least by Internet Engineering Task Force (IETF) Request For Comments (RFC) 6536, 8341, etc., to define privileges to the configuration information/datastore (e.g., read access, write access, etc.). In general, a NETCONF client is a network management function that terminates the NETCONF protocol and interacts with a NETCONF server to get or edit the contents of the managed device's configuration information/datastore.

Generally, an O-RU 301 may implement any combination of a cellular and/or wireless air interface for any combination of Radio Access Technology (RAT) types (sometimes referred to more generally as 'accesses') within an O-RAN architecture such as, but not limited to: non-3GPP unlicensed spectrum accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; cellular accesses such as 3GPP licensed spectrum accesses (e.g., 3rd Generation (3G), 4G/LTE, 5G, and/or next Generation (nG) accesses) and/or 3GPP unlicensed spectrum accesses (e.g., Licensed-Assisted Access (LAA), enhanced LAA (eLAA), further enhanced LAA (feLAA), and New Radio Unlicensed (NR-U)); Citizens Broadband Radio Service (CBRS) accesses; combinations thereof; and/or the like.

Thus, an O-RU 301 may be inclusive of any configuration/combination of 3GPP 4G/LTE evolved Node Bs (eNBs or eNodeBs), 5G next Generation Node Bs (gNBs or gNodeBs), and/or any other next Generation access nodes that may include hardware and/or software to perform signal processing (such as beamforming) as well as hardware (e.g., transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., Wi-Fi®, 4G/LTE, 5G, nG, CBRS, etc.) through which one or more user equipment may utilize to connect to an O-RU 301 for one or more sessions (e.g., voice, video, data, gaming, combinations thereof, etc.). In current implementations, an O-RU 301 interfaces with a single O-DU 314, 316.

Generally, an O-DU 314, 316 (also sometimes referred to as a baseband unit) may provide lower level operations of the radio signal processing stack, such as Radio Link Control (RLC), Medium Access Control (MAC), and upper physical (PHY) layer operations, such as digital processing, including signal modulation, encoding, and scheduling, among others. The MAC processing implemented by the O-DU includes the scheduler functionality operated by each tenant operator that schedules physical layer resources of the shared O-RU. These physical layer resources may include resources operated to support common channels (e.g., PCH channels in the down-link and PRACH channels in the up-link) and resources operated to support dedicated channels (e.g., Dedicated Traffic Channels in both the up-link and down-link). The O-DU is further responsible for consolidating all the paging records for a particular Paging Frame (PF) and broadcasts the paging message towards the UEs using the resources operated to support the PCH channel.

The O-DU 314, 316 interfaces with an ORAN Central or Centralized Unit (O-CU), which can further interface with a mobile core network, which may be configured as any combination of a 4G/LTE core, typically referred to as the Evolved Packet Core or System (EPC/EPS), a 5G core or system (5GC/5GS), a next generation core or system (nG), and/or the like. The O-CU may provide upper level operations of a radio signal processing stack, such as Packet Data Convergence Protocol (PDCP) functions and radio resource control, among others. The split of operations of a radio signal processing stack among between an O-DU and O-CU can be varied depending on implementation and/or configuration of a given ORAN/network architecture.

As prescribed by the O-RAN Alliance WG4 Specification 'O-RAN.WG4.MP.O-v04.00', a 'processing element endpoint' can be configured on an O-RU based on the O-DU to which it is assigned or 'homed' in which the processing element endpoint includes transport-based identifiers that define local and remote endpoints that are to be used for specific data flows between a given O-RU and the O-DU to which the O-RU is assigned. Stated differently, a processing element endpoint is the O-RAN construct used to configure flows (that can be used for data flow transport, measurement operations, etc.) on the fronthaul interface between each O-RU and the O-DU with which each O-RU is assigned.

In various embodiments, a processing element endpoint configuration, depending on the transport type/network connectivity (e.g., Ethernet, IP, etc.) between each O-DU/O-RU, may identify any of: different (alias) Media Access Control (MAC) addresses, virtual local area network (VLAN) identity and MAC addresses; and/or User Datagram Protocol (UDP) ports and Internet Protocol (IP) addresses for the O-DU to which each O-RU is assigned. A particular processing element endpoint definition configured for a given O-RU/O-DU assignment can be provided a 'name' or other identifier that can be used by other systems, nodes, etc. to tie certain flows to O-DUs.

As prescribed by the O-RAN Alliance WG4 Specification 'O-RAN.WG4.MP.0-v04.00', the configuration of carriers involves the use of identifiers that are required to be unique across an O-RU. The identifiers include read only parameters that are predefined in the O-RU, for example the list of static-low-level-tx-endpoints and static-low-level-Rx-endpoints that define the various capabilities of endpoints. The identifiers also include writeable parameters for carrier configuration that can be associated with the read only parameters, for example, low-level-tx-links, low-level-rx-links, tx-array-carriers and rx-array-carriers. Furthermore, the configuration includes the list of extended Antenna-Carrier (eAxC) identifiers that are defined to be used across the packetized fronthaul interface to enable identification of fronthaul traffic flows.

For current sharing use cases for O-RAN, shared O-RU Phase 1 involves a split of carriers between tenant operators (e.g., tenant#1 and tenant#2), as shown in FIG. 3. This can be achieved by defining a split configuration whereby the different identifiers are partitioned between tenant #1 and tenant #2. This enables the O-RU physical aspects to be shared but leads to sub-optimum resource utilization. (e.g., a 100 MHz O-RU can be split into two virtual 50 MHz O-RUs wherein a UE cannot instantaneously benefit from the 100 MHz capability of the O-RU). In accordance with techniques herein, as discussed above, a new capability may be defined in 3GPP to partition resources associated with common channels between tenants.

Figure 4:
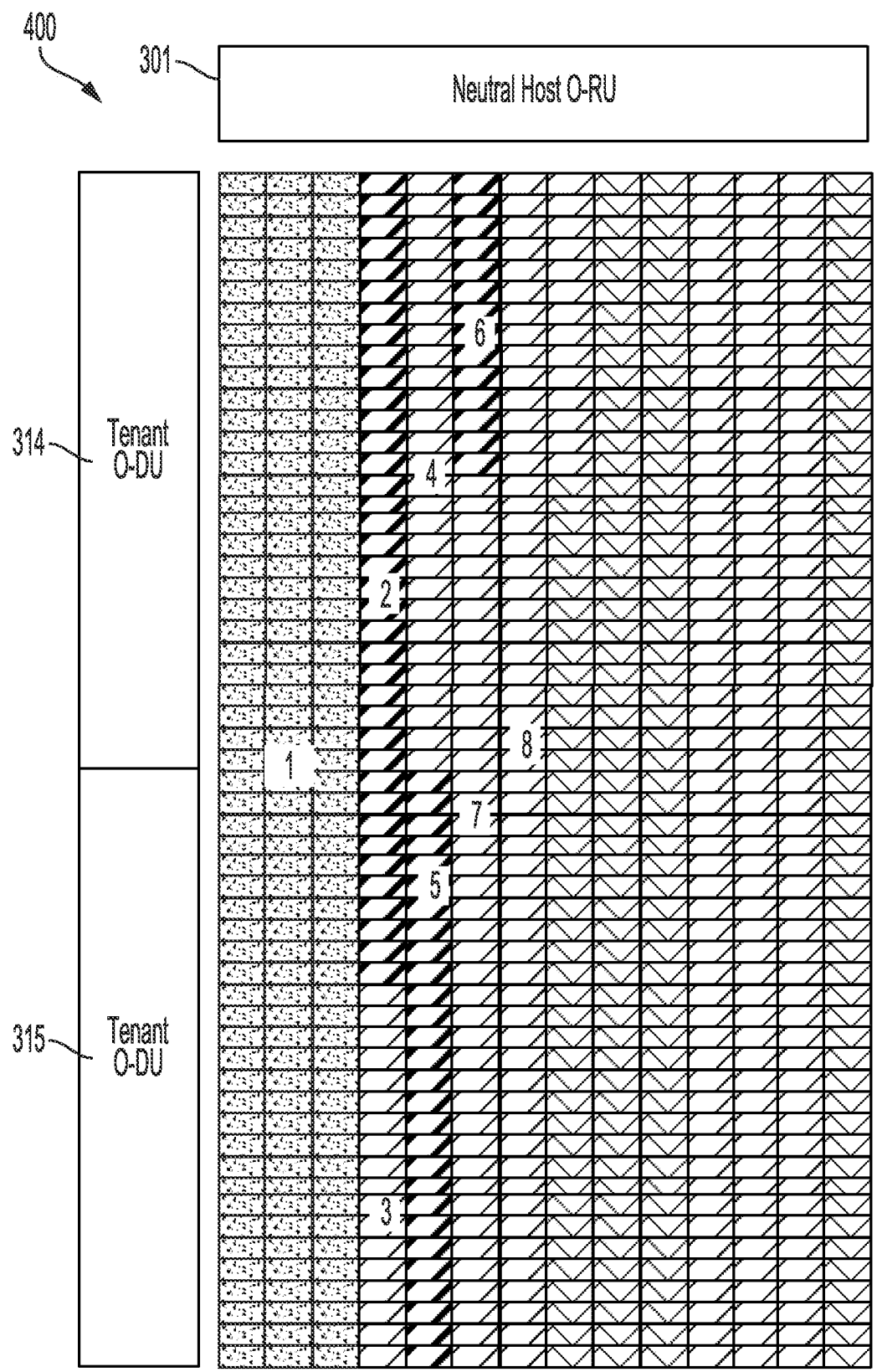
FIG. 4 illustrates a block diagram associated with partitioning radio resources to enable neutral host operation for a radio access network involving an open fronthaul interface utilizing the system of FIG. 3 in accordance with some aspects of the present technology.

FIG. 4 illustrates an example diagram of a frame structure 400 associated with example radio resource partitioning using current techniques, according to an example of the instant disclosure. The frame structure 400 of 5G illustrating a number of different Physical Resource Blocks (PRBs), with each square symbol or cell representing a resource element corresponding to a single symbol and single subcarrier. As prescribed by the O-RAN Alliance WG4 Specification' O-RAN.WG4.CUS.0-v04.00', the resource elements are encoded using frequency domain IQ samples. Individual sections of these particular resource elements are sent over the open fronthaul interface 402 between the O-DU 314, 316 and O-RU 301, and received by the O-RU 301 and transmitted towards the UEs. Same for the uplink, radio signals are received and placed into the sections, and the transmitted toward the O-DU 314, 316 where they can be received. Therefore, these PRBs may be separated into tenants (tenant #1 represented by light grey and tenant #2 represented by dark grey) and that logical separation allows sharing of the O-RU 301 between the two tenants.

Data sections in a shared fronthaul need to be processed according to increasing symbol number (e.g., 1, 2, 3, . . . 8) and the numbers may indicate order of section IDs across the fronthaul. For example, symbol timing for Section ID#3 by light grey tenant needs to follow transmission for Section ID#2 by dark grey tenant. Furthermore, each tenant needs to run its own parallel timing to ensure there is a smooth transition between the PRB allocated to tenant #1 and the subsequent PRB allocated to tenant #2. A tenant needs to be able to keep synchronization with the data sections allocated to another O-DU.

There may be different resource allocation strategies. Static allocation may be used when tenant is allocated a dedicated set of PRBs. This is an improvement in resource allocation over per carrier allocation (can operate sub 5 MHz). Semi static allocation may be used when tenant is allocated a set of PRBs for a substantial number of frames. This is a better resource allocation, whereby each tenant can request their requirements. Likelihood of unused resources reduced and ability to dynamically vary allocations from <5 MHz to >20 MHz. Dynamic allocation may be used when tenant is allocated a set of PRBs and is signaled in advance of frame which resources are allocated. This is for optimized resource allocation — heaviest impact on scheduler configuration.

For example, for 100 PRBs for 20 MHz, for Symbol "n" static/semi-static/dynamic allocation is:
PRB 0-24 to Tenant #1
PRB 25-74 to Tenant #2
PRB 75-99 to Tenant #3

Tenants may operate on a common frame time base with varying offsets according to allocations.

Tenant #1 may sends its CU-Plane using a timebase of Symbol "n"+0 offset Tenant #2 may sends its CU-Plane using a timebase of Symbol "n"+¼ symbol offset Tenant #3 may sends its CU-Plane using a timebase of Symbol "n"+¾ symbol offset The NH operator or shared O-RU operator 303 may configure the PRB resources, and agree with each tenant about how to partition those resources between the tenants. In a preferred embodiment, each individual tenant uses their allocated PRBs to support all the necessary radio channels operated when communicating with their respective UEs 212, (e.g., including PRACH channels in the up-link and Dedicated Traffic Channels in both the up-link and down-link directions). In one particular embodiment, for the PRACH random access channel, new system information needs to be configured by shared O-RU operator 303 which is then broadcast by a broadcast channel on shared O-RU 301 and received by individual UEs 212 belonging to the plurality of tenants. This system information needs to provide individual information to UEs 212 to enable a tenant's respective UEs to use a PRACH channel using the distinct PRBs allocated to the particular tenant when performing the random access procedure. Therefore, in one embodiment, tenant #1 may be allowed to a certain set of resources for random access and tenant #2 may be allowed to a different set of mutually exclusive sources for random access. If there is an additional tenant #3, a third set may be available for random access. Public land mobile network IDs (PLMN IDs) are configured in the broadcast channels in a system information broadcast. The same capability can be leveraged wherein a particular sets of channels is associated with a set of PLMN IDs.

Figure 5:
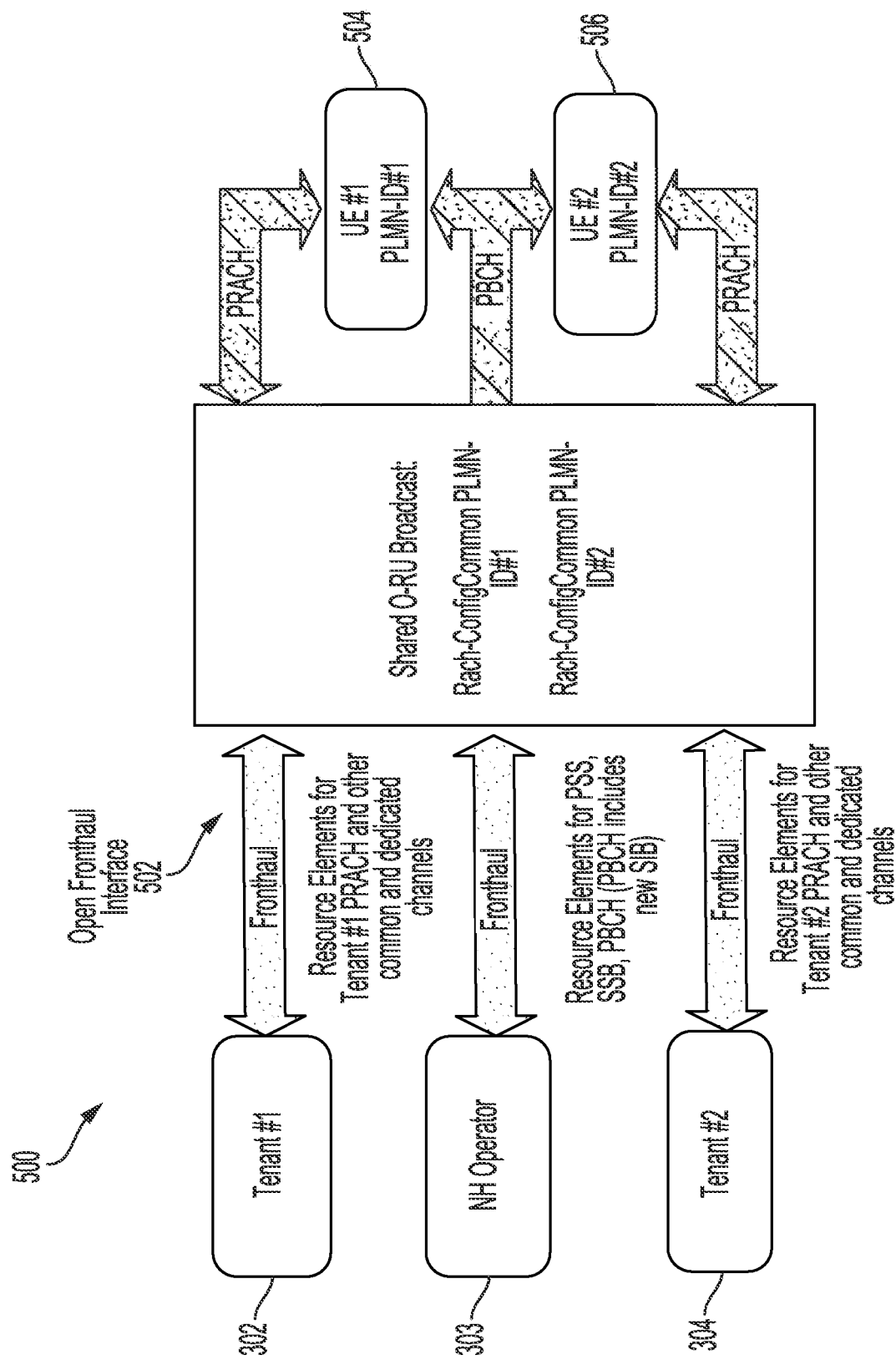
FIG. 5 illustrates example details associated with example radio resource partitioning using current techniques in accordance with some aspects of the present technology.

FIG. 5 illustrates a block diagram 500 associated with partitioning radio resources to enable neutral host operation for a radio access network involving an open fronthaul interface 502 utilizing the system of FIG. 3, according to an example of the instant disclosure.

Across the open fronthaul interface 502, the NH operator 303 is in charge of all the broadcast channels and system information, but each tenant 302, 304 has a responsibility to configure reception of physical random access channels (PRACH). The NH operator 303 can agree to a first set of PRACH resources to use with tenant operator #1 302 and can also agree a second set of PRACH resource to use with tenant operator #2 304. As discussed above, a new System Information Block (SIB) can be defined to broadcast the PRACH configuration qualified on a per PLMN-ID basis (e.g., UplinkConfigCommonSIB that includes an extended BWP-UplinkCommon IE or the new BWP-UplinkCommon-Qualified IE in which the 'plmn-IdentityInfoList includes the PLMN-IDs for which the BWP-UplinkCommon aspects apply). During operation, a UE 504, 506 can use the PLMN-ID used for network selection to determine which PRACH resources to utilize for communications.

As discussed above, the NH operator 303 can allocate a unique identity to each operator and require each operator to use the identity in further refining the identification of sub frame numbers in which to send paging frames. During operation, each operator can use their unique tenant identifier in a modified paging frame algorithm to determine which subset of paging frames operated using resources of the shared O-RU 301 are available for use by a specific operator. The allocation of paging opportunities to individual tenants is opaque to the UE 504, 506 which can continue to use the 3GPP defined algorithm to calculate the necessary paging frames to decode.

In 3GPP NR, a base station can restrict a user equipment (UE) to transmit/receive in a subset of the total available PRBs available used for uplink (UL) and downlink (DL) transmissions. This subset of resources is known as a Bandwidth Part or BWP, as defined by 3GPP Technical Specification (TS) 38.211. The concept of a Bandwidth Part can be used to implement 5G RAN slicing or MORAN tenancy in a Neutral Host Network (NHN): that is, allocate spectrum to different entities each with their own RAN elements. A BWP occupies a contiguous set of PRBs of a common numerology. However, the initial Random-Access Channel (RACH) procedure and Paging Channel (PCH) procedure cannot be partitioned and are defined for a whole cell. As the RACH procedure is used to signal resources for sending the subsequent Radio Resource Control (RRC) Connection Request message, this means that the reception of the RRC Connection Request message also cannot be partitioned, e.g., between different operators. As the PCH procedures are triggered by the user plane function of individual operators, then this means that the paging functionality cannot be partitioned, e.g., between different operators.

Specifically, 3GPP NR defines an uplink configuration System Information Block (SIB), referred to as 'UplinkConfigCommonSIB', which contains an 'initialUplinkBWP' Information Element (IE) that then defines the rach-Config-Common for use in a given cell. However, the common definition of RACH prohibits splitting of RACH processing between different tenant operators or slice operators. Thus, this prevents a neutral host or the RAN slice from being able to operate 5G NR radio effectively and independently of other operators (i.e., a single entity will be responsible for supporting RACH and the subsequent RRC Connection Request handling).

Techniques presented herein provide for defining an optional capability to qualify an uplink common configuration on a per Public Land Mobile Network Identity (PLMN-ID) basis (e.g., a per-tenant operator basis or per-slice operator basis). This enables a tenant operator or slice operator that uses a specific PLMN-ID configured in the PLMN-IdentityInfo to operate its own RACH processing independently of a second operator who uses a second PLMN-ID that is distinct from the first PLMN-ID.

In at least one embodiment, the technique may be implemented by extending the current BWP-UplinkCommon IE. In at least one embodiment, the technique may be implemented by defining a new (e.g., BWP-UplinkCommon-Qualified). For this embodiment, an example BWP-Uplink-Common-Qualified IE is shown below represented in ASN.1 syntax:

```
BWP-UplinkCommon-Qualified ::= SEQUENCE {
    plmn-IdentityInfoList,
    genericParameters BWP,
    rach-ConfigCommon SetupRelease { RACH-ConfigCommon }
        OPTIONAL, -- Need M
    pusch-ConfigCommon SetupRelease { PUSCH-ConfigCommon }
        OPTIONAL, -- Need M
    pucch-ConfigCommon SetupRelease { PUCCH-ConfigCommon }
        OPTIONAL, -- Need M ...,
    [[ rach-ConfigCommonIAB-r16 SetupRelease {
        RACH-ConfigCommon } OPTIONAL, --
Need M
    useInterlacePUCCH-PUSCH-r16 ENUMERATED {enabled}
        OPTIONAL, -- Need R
    msgA-ConfigCommon-r16 SetupRelease { MsgA-ConfigCommon-r16
        } OPTIONAL -- Cond
SpCellOnly2
    ]]
    }
```

For the example BWP-UplinkCommon-Qualified IE, the 'plmn-IdentityInfoList includes the PLMN-IDs for which the BWP-UplinkCommon aspects apply.

Furthermore, a 3GPP NR specifically defines the scheduling of paging frames sent to specific UEs whereby the UEs are required to listen for the possible transmission of a paging message being sent to a UE. Techniques presented herein provide for defining the ability to partition the paging channel resources on a per-tenant operator or pre-slice operator basis. This enables the tenant operator or slice operator to operate its own PCH procedures independently of a second operator.

In at least one embodiment, the technique may be implemented by allocating unique identities to individual tenant operators or individual slice operators and to use the allocated identity to further partition the paging opportunities between separate operators. For this embodiment, whereas the Sub Frame Number (SFN) for sending a Paging Frame (PF) towards a UE with an identity UE_ID is defined according to the equation $$PF = SFN \bmod T = (T \operatorname{div} N) \times (UE\_ID \bmod N)$$

Where T and N are common parameters broadcast in the SIB.

The paging opportunity for a particular tenant-operator or slice-operator, allocated an identity operator-id, is further restricted to when $$PF \bmod(\text{number of operators}) = \text{operator-id}$$

Figure 6:
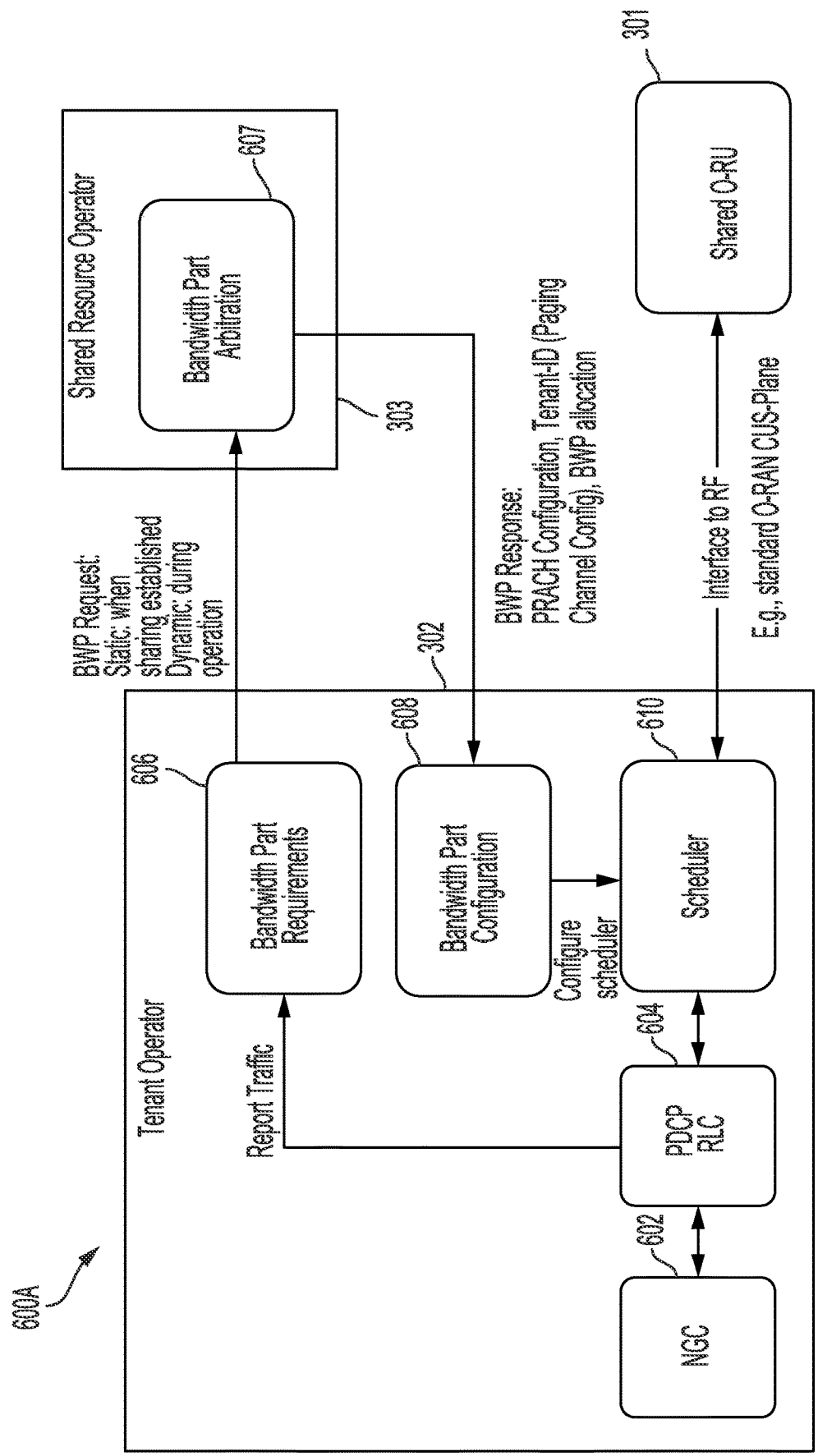
FIG. 6 is a diagram of a system in which techniques may be implemented to facilitate partitioning radio resources to enable neutral host operation for a radio access network in accordance with some aspects of the present technology.

FIG. 6 illustrates a diagram of a system in which techniques may be implemented to facilitate partitioning radio resources to enable neutral host operation for a radio access network, according to an example of the instant disclosure. Resources may be requested based on reacting to specific traffic requirements. A next generation core (NGC) 602 may interface with a Packet Data Convergence Protocol (PDCP) on top of a Radio Link Contro (RLC) layer 604. The PDCP may report traffic to determine bandwidth part (BWP)

requirement 606, which is sent to a BWP arbitration 607 of a shared resource operator 303. A BWP request may be static when sharing is established and dymaic during operation. A BWP response is sent and may include PRACH Configuration, Tenant-ID (Paging Channel Config), BWP allocation. A BWP configuration 608 is used to configure a scheduler 610, which may then interface to a shared RU, via e.g., a standard O-RAN CUS-Plane.

Figure 7A:
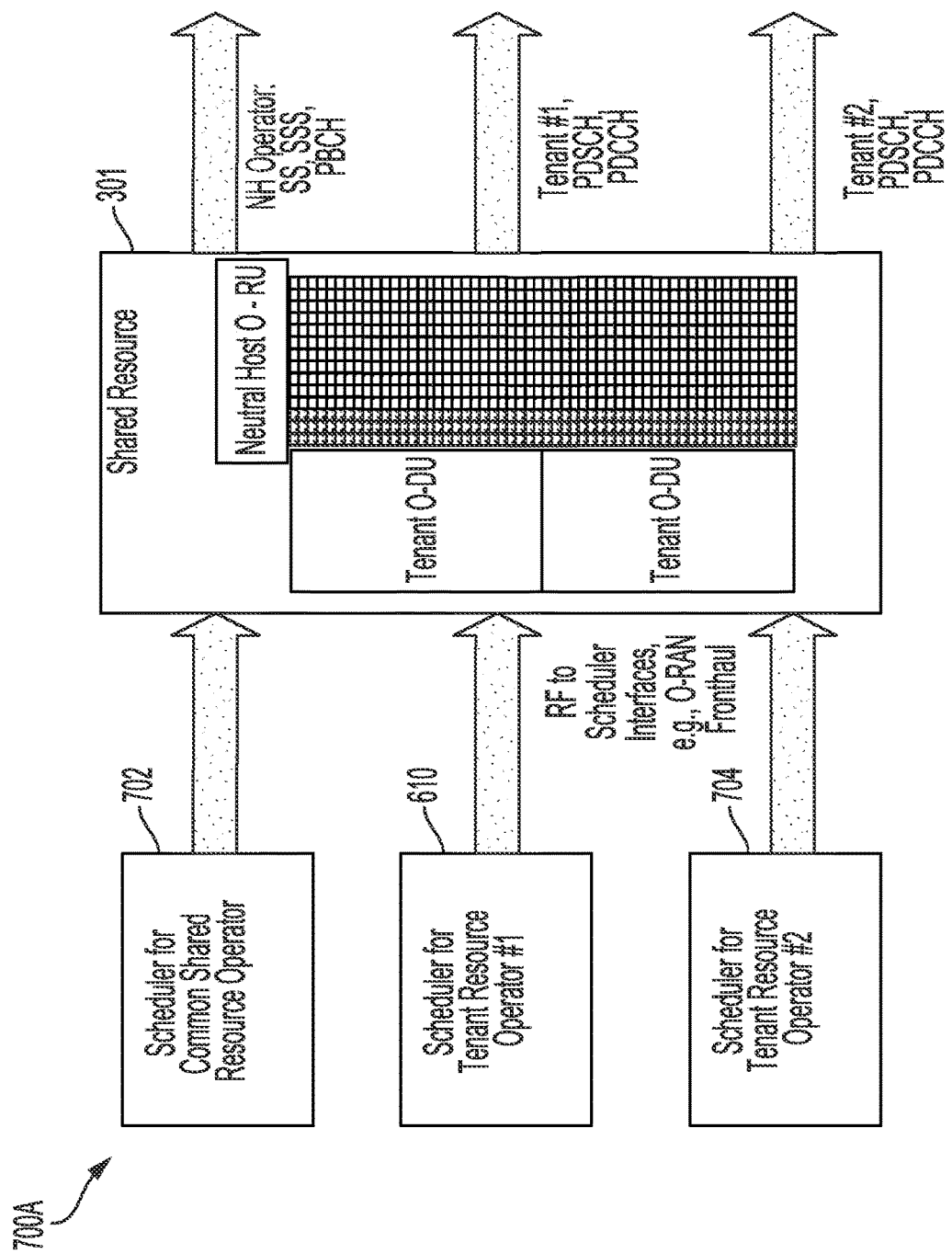
FIG. 7A illustrates example details regarding partitioning of downlink channels for neutral host operation utilizing the system of FIG. 6 in accordance with some aspects of the present technology.
Figure 7B:
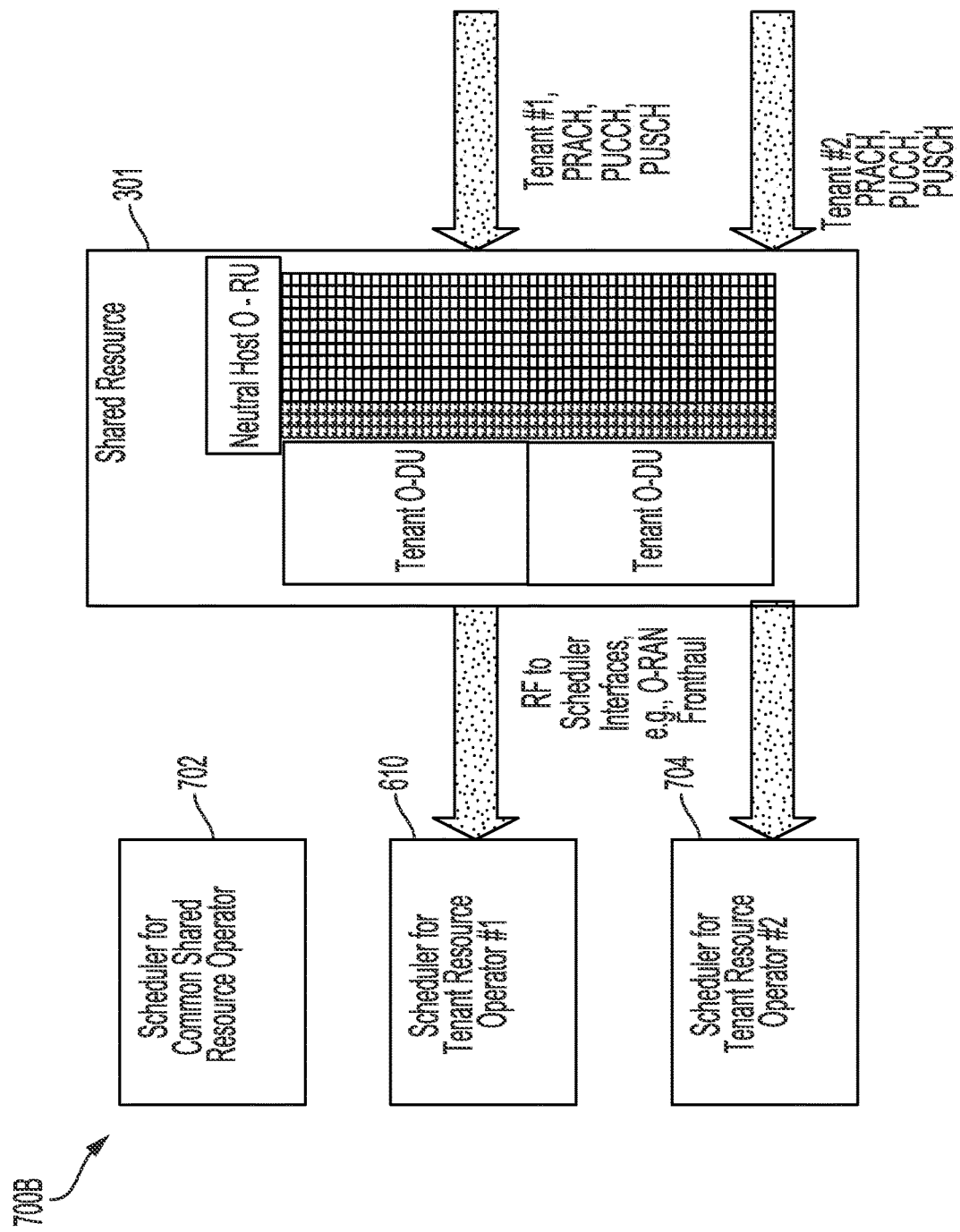
FIG. 7B illustrates example details regarding partitioning of uplink channels for neutral host operation utilizing the system of FIG. 6 in accordance with some aspects of the present technology.

FIG. 7A illustrates an example diagram of a neutral host operation for partitioning of downlink channels utilizing the system of FIG. 6. FIG. 7B illustrates an example diagram of a neutral host operation of partitioning of uplink channels utilizing the system of FIG. 6, according to an example of the instant disclosure.

For example, the neutral host operator can implement an open multi-vendor interface for individual tenant operators or slice operators to request PRB/BWP (radio) resources. In such an embodiment, the neutral host operator can use internal algorithms to effectively partition the resources and indicate the determined resources back to each operator. Each tenant or slice operator can then configure their respective Tenant O-DUs 314 316 to use the allocated resources. As prescribed by the O-RAN Alliance WG4 Specification 'O-RAN.WG4.MP.0-v04.00', the individual Tenant O-DUs 314 316 will use their respective NETCONF clients 322 324 to configure the shared O-RU 301 with their respective partitioned resources. In this manner, the RAN resources can be effectively partitioned and used in a plurality of independently operated scheduler instances.

In one embodiment, the shared resource operator 303 is responsible for confirming that each tenant or slice operator is configuring is resources according to pre-agreed sharing policies. In one embodiment, the shared resource operator 303 operates a pass through/proxy scheduler 702 function that receives scheduling information from a plurality of schedulers 610, 704 operated by the plurality of individual tenant or slice operators. The pass through/proxy scheduler 702 is then responsible for ensuring that resources are shared according to agreed policies.

In another embodiment, the shared resource operator 303 operates NETCONF Client 313 to signal the NETCONF Server 305 in the shared O-RU 301 and recover the configuration of the shared O-RU 301. The shared resource operator is then able to ensure that the resources configured by the individual Tenant Operators 302 304 adhere to the agreed sharing policies.

The partitioning of the RACH processing and PCH operation ensures mutually exclusive resources are used by the tenant or slice operators, enabling the entirety of the scheduler (as shown in FIG. 6) to be partitioned, enabling tenant or slice operators to separately configure and control how resources for the physical RACH (PRACH), common paging Channels (PCH) and dedicated channels are scheduled.

In one embodiment, the shared resource operator 303 is responsible for operating a fronthaul link used to support the transmission of the common downlink channels, such as the Primary Synchronization Signal (PSS) channel, the Synchronization Signal Block (SSB) channel, and the Packet Broadcast Control Channel (PBCCH). The agreement with the tenant or slice operators can be used to determine the BWPUplinkCommon-Qualified information element broadcast using the PBCCH. The NH operator can partition resources to allocate mutually exclusive BWPs to each operator. When operating a fronthaul network as prescribed by the O-RAN Alliance WG4 Specification 'O-RAN.WG4.CUS.0-v04.00', this will include the definition of the Physical Resource Blocks (PRBs) allocated to enable each operator to configure the startPrbc and numPrbc parameters used to identify the PRBs sent across a fronthaul interface to ensure the use of mutually exclusive sections over the fronthaul.

Figure 7C:
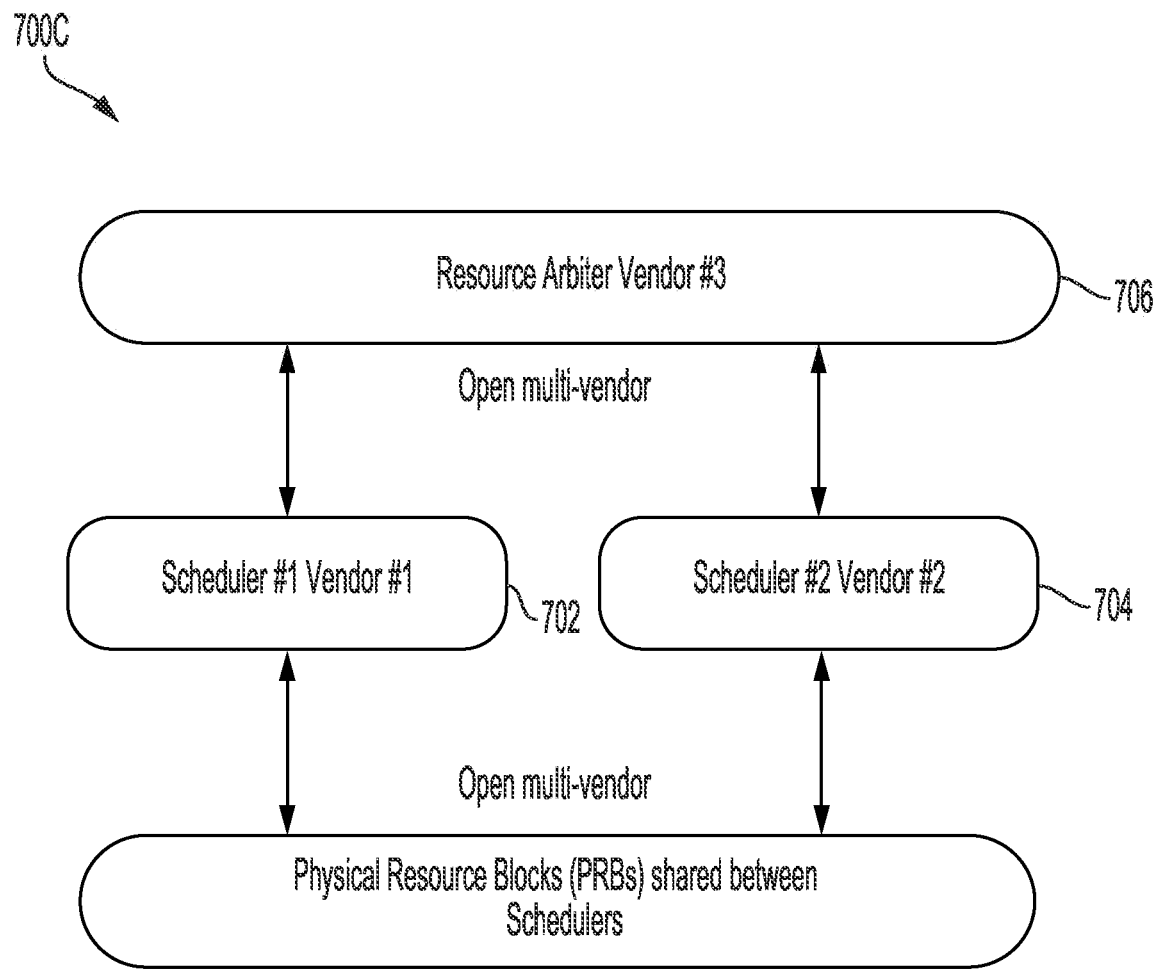
FIG. 7C illustrates an example diagram of independent tenant scheduling in Physical Resource Blocks (PRBs) utilizing a PRB resource arbiter in accordance with some aspects of the present technology.

FIG. 7C illustrates an example diagram 700C of independent tenant scheduling in Physical Resource Blocks (PRBs) utilizing a PRB resource arbiter 706, according to an example of the instant disclosure.

In at least one embodiment, the PRB resource arbiter 706 may be operated by a third party (e.g., in a neutral host scenario). During operation, the PRB resource arbiter 706 can receive resource requests from individual schedulers (e.g., 702, 704) and can respond to resource requests with resource responses that indicate the granted resources. Under an assumption that granted resources are to be bound in time, it can be assumed that prior to grant expiry, a given scheduler is to request further resources from the PRB resource arbiter 706.

Figure 8A:
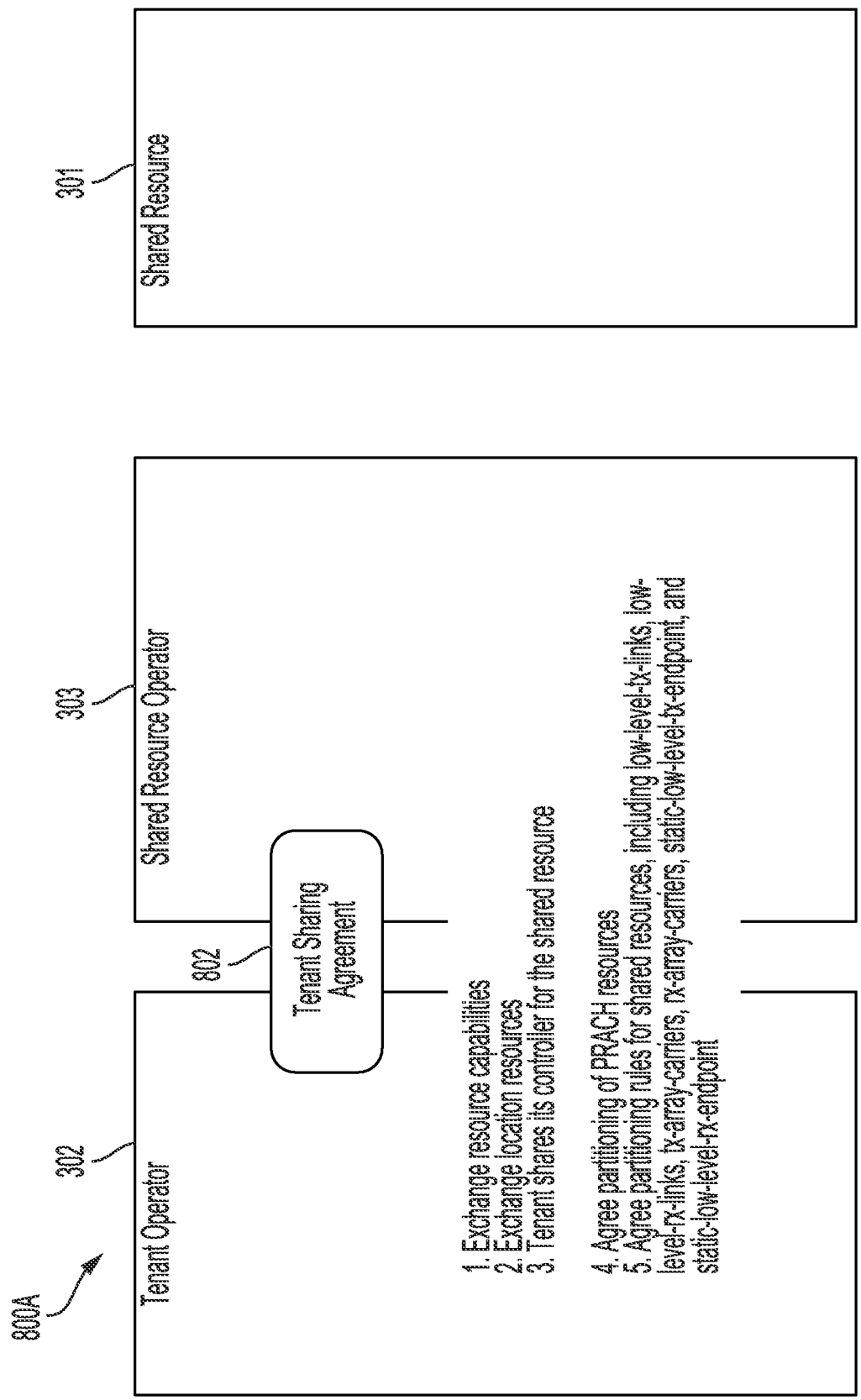
FIGS. 8A and 8B are block diagrams illustrating example details associated with forming an agreement between a tenant operator and a shared resource operator concerning partitioning of radio resources and validating the agreement in accordance with some aspects of the present technology.
Figure 8B:
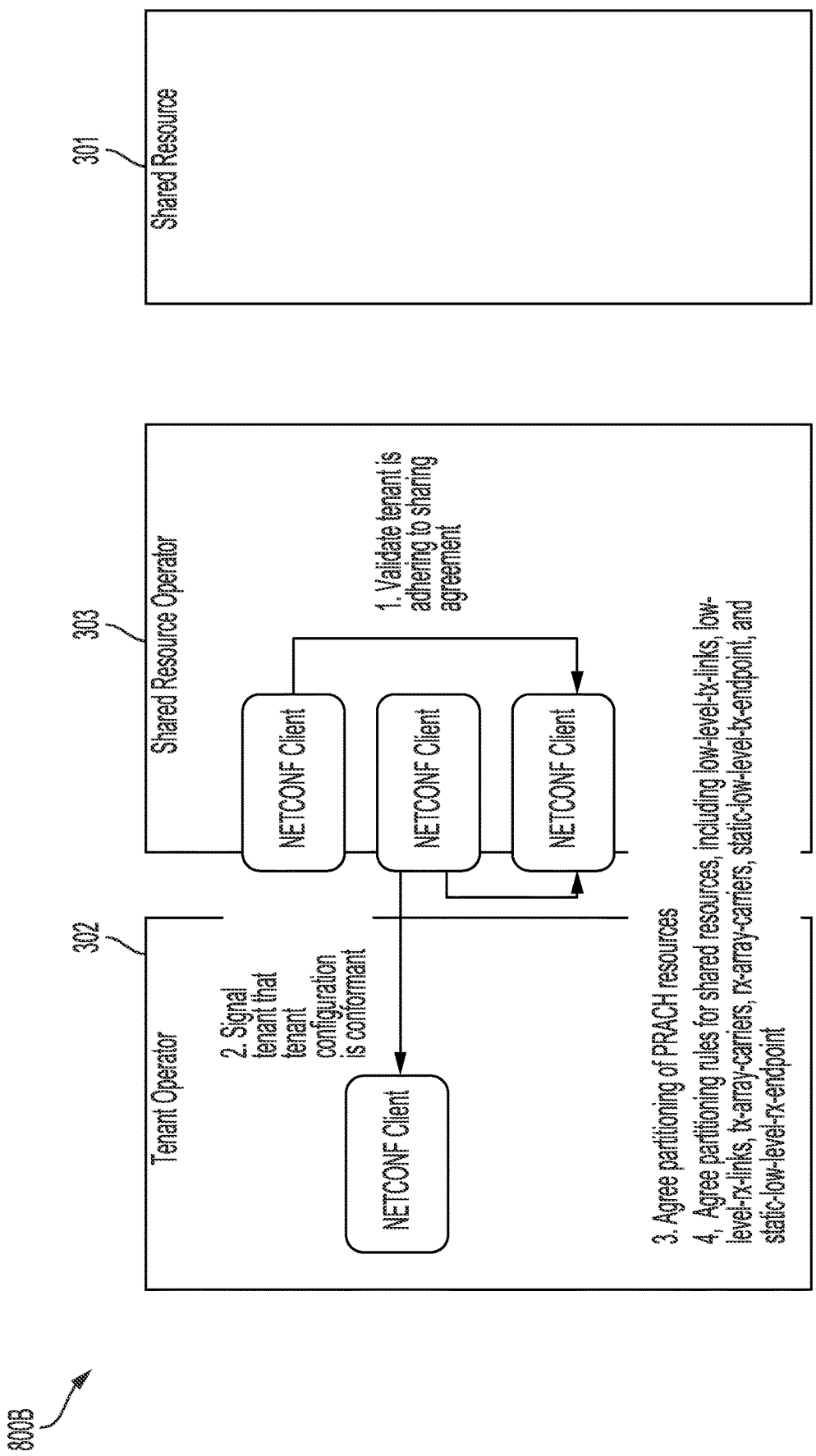

FIGS. 8A and 8B are block diagrams 800A, 800B illustrating example details associated with forming an agreement between a tenant operator and a shared resource operator concerning partitioning of radio resources and validating the agreement, according to an example of the instant disclosure.

Techniques of the present disclosure can be extended to a neutral host (NH) or shared resource operator environment, as shown in FIG. 8A or 8B, in which a tenant operator 302 and a shared resource operator 303 can form a tenant sharing agreement 802, which can later be verified when the tenant operator 302 seeks to utilize a shared resource 301 (e.g., a shared O-RU) to ensure that the tenant operator is utilizing the shared resource in conformance with the tenant sharing agreement 802.

In one example, that is exemplified by the block diagram 800A of FIG. 8A, the tenant operator 302 and the shared resource operator 303 exchanges resource capabilities, location resources, and the tenant shares its controller for the shared resource. The shared resource operator 303 may then agree to partitioning of PRACH resources and other shared resources. In another example, exemplified the block diagram 800B of FIG. 8B, the shared resource operator 303 may first validate that tenant operator 302 is adhering to a sharing agreement. The shared resource operator 303 may then signal that tenant configuration is conformant and then agree to the partitioning of PRACH resources and other shared resources.

Furthermore, the shared resource operator 303 may partition eAxC identifiers between separate tenant operators and is able to verify that when each tenant operator seeks to separately configure the shared resource that the configuration only uses the allocated identifiers.

Figure 9:
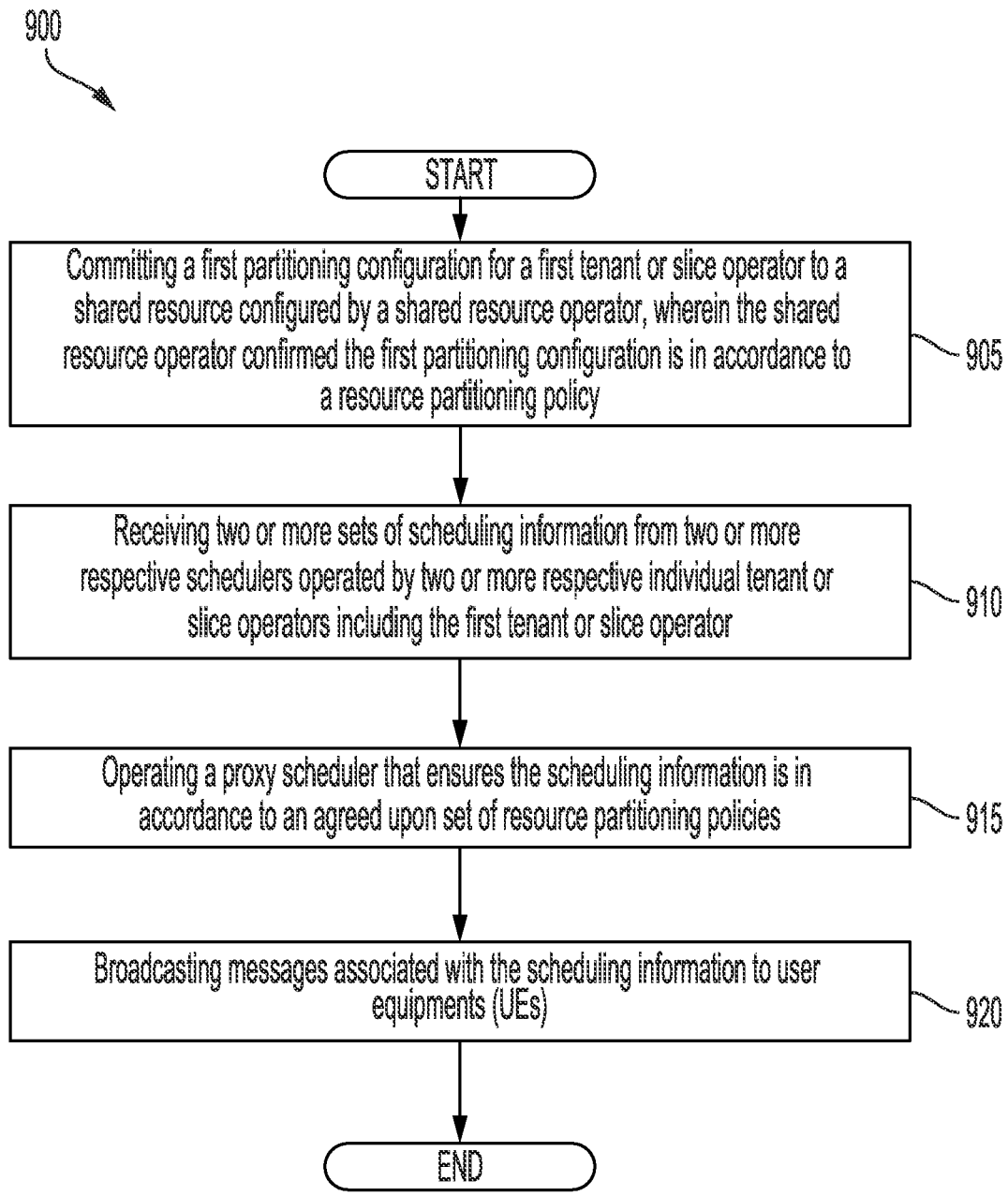
FIG. 9 illustrates an example method for scheduling radio transmissions across multiple operators of a shared O-RU configuration in accordance with some aspects of the present technology.

FIG. 9 illustrates an example method 900 for scheduling radio transmissions across multiple operators. Although the example method 900 depicts a particular sequence of operations, the sequence may be altered without departing from the scope of the present disclosure. For example, some of the operations depicted may be performed in parallel or in a different sequence that does not materially affect the function of the method 900. In other examples, different components of an example device or system that implements the method 900 may perform functions at substantially the same time or in a specific sequence.

According to some examples, the method includes committing a first partitioning configuration for a first tenant or slice operator to a shared resource configured by a shared resource operator at step 905. For example, a shared resource operator, such as a shared O-RU Operator 303 illustrated in FIGS. 3, 5, 6, 8A-8B may commit a first partitioning configuration for a first tenant or slice operator to a shared resource configured by a shared resource operator. In some examples, shared resource operator confirmed the first partitioning configuration is in accordance to a resource partitioning policy.

According to some examples, the method includes receiving two or more sets of scheduling information from two or more respective schedulers operated by two or more respective individual tenant or slice operators including the first tenant or slice operator at step 910. For example, a shared resource operator, such as a shared O-RU Operator 303 illustrated in FIGS. 3, 5, 6, 8A-8B may receive two or more sets of scheduling information from two or more respective schedulers operated by two or more respective individual tenant or slice operators including the first tenant or slice operator. In some examples, each set of scheduling information is based on reported traffic and includes separate resource configuration and scheduling for channels including at least one of physical random-access channels, common paging channels, and dedicated channels.

According to some examples, the method includes operating a proxy scheduler that ensures the scheduling information is in accordance to an agreed upon set of resource partitioning policies at step 915. For example, a shared resource operator, such as a shared O-RU Operator 303 illustrated in FIGS. 3, 5, 6, 8A-8B may operate a proxy scheduler that ensures the scheduling information is in accordance to an agreed upon set of resource partitioning policies.

According to some examples, the method includes broadcasting messages associated with the scheduling information to user equipments (UEs at step 920. For example, a shared resource operator, such as a shared O-RU Operator 303 illustrated in FIGS. 3, 5, 6, 8A-8B may broadcast messages associated with the scheduling information to user equipments (UEs). In some examples, semi static allocation can dynamically vary allocations from sub 5 MHz to more than 20 MHz. In some examples, the shared resource is a shared open radio unit (O-RU). In some examples, the shared resource operator operates or enables a third-party operator to operate a fronthaul link that supports transmission of common downlink channels including at least one of a Primary Synchronization Signal (PSS) channel, a Synchronization Signal Block (SSB) channel, and a Packet Broadcast Control Channel (PBCCH. In some examples, when operating a fronthaul network, Physical Resource Blocks (PRBs) are defined to enable each operator to configure beginning and end parameters used to identify the PRBs to ensure use of mutually exclusive data sections over the fronthaul network.

According to some examples, the method includes agreeing to a first set of physical random-access channels with the first tenant or slice operator and a second set of physical random-access channels with a second tenant or slice operator. For example, a shared resource operator, such as a shared O-RU Operator 303 illustrated in FIGS. 3, 5, 6, 8A-8B may agree to a first set of physical random-access channels with the first tenant or slice operator and a second set of physical random-access channels with a second tenant or slice operator.

According to some examples, the method includes agreeing to a first set of common paging channels with the first tenant or slice operator and a second set of common paging channels with the second tenant or slice operator. For example, a shared resource operator, such as a shared O-RU Operator 303 illustrated in FIGS. 3, 5, 6, 8A-8B may agree to a first set of common paging channels with the first tenant or slice operator and a second set of common paging channels with the second tenant or slice operator.

According to some examples, the method includes allocating a unique identifier to each operator of the shared resource operator and the two or more respective individual tenant or slice operators. For example, a shared resource operator, such as a shared O-RU Operator 303 illustrated in FIGS. 3, 5, 6, 8A-8B may allocate a unique identifier to each operator of the shared resource operator and the two or more respective individual tenant or slice operators. In some examples, each operator is required to use the unique identifier in further refining a particular set of the channels. In some examples, the broadcasted messages include the unique identifiers for respective UEs. In some examples, each operator is required to use the unique identifier in further refining identification of sub-frame numbers in which to broadcast paging frames. In some examples, each operator can use their unique identifier in a modified paging frame algorithms to determine which subset of paging frames operated using resources of the shared resource are available for use by each operator. In some examples, the allocation of paging opportunities to each of the two or more individual tenant or slice operators is opaque to a user equipment (UE). In some examples, the UE continues to use a 3GPP defined algorithm to calculate necessary paging frames to decode.

According to some examples, the method includes confirming that a set of partitioning configurations including the first partitioning configuration based on unique identifiers between each operator of the two or more respective individual tenant or slice operators is in accordance with the resource partitioning policy. For example, a shared resource operator, such as a shared O-RU Operator 303 illustrated in FIGS. 3, 5, 6, 8A-8B may confirm that a set of partitioning configurations including the first partitioning configuration based on unique identifiers between each operator of the two or more respective individual tenant or slice operators is in accordance with the resource partitioning policy.

According to some examples, the method includes committing the set of partitioning configurations. For example, a shared resource operator, such as a shared O-RU Operator 303 illustrated in FIGS. 3, 5, 6, 8A-8B may commit the set of partitioning configurations. In some examples, each operator seeks to separately configure the shared resource by only using respective allocated identifiers.

According to some examples, the method includes based on the agreed upon set of resource partitioning rules, partitioning resources to allocate mutually exclusive Bandwidth Parts (BWPs) to each tenant operator. For example, a shared resource operator, such as a shared O-RU Operator 303 illustrated in FIGS. 3, 5, 6, 8A-8B may be based on the agreed upon set of resource partitioning rules, partition resources to allocate mutually exclusive Bandwidth Parts (BWPs) to each tenant operator.

According to some examples, the method includes maintaining timing synchronization during periods of time when PRB resources have not been allocated between a first tenant or slice and a second tenant or slice. For example, a shared resource operator, such as a shared O-RU Operator 303 illustrated in FIGS. 3, 5, 6, 8A-8B may maintain timing synchronization during periods of time when PRB resources have not been allocated between a first tenant or slice and a second tenant or slice. In some examples, each of the first tenant or slice and the second tenant or slice runs their own parallel timing to ensure a seamless switchover.

Figure 10:
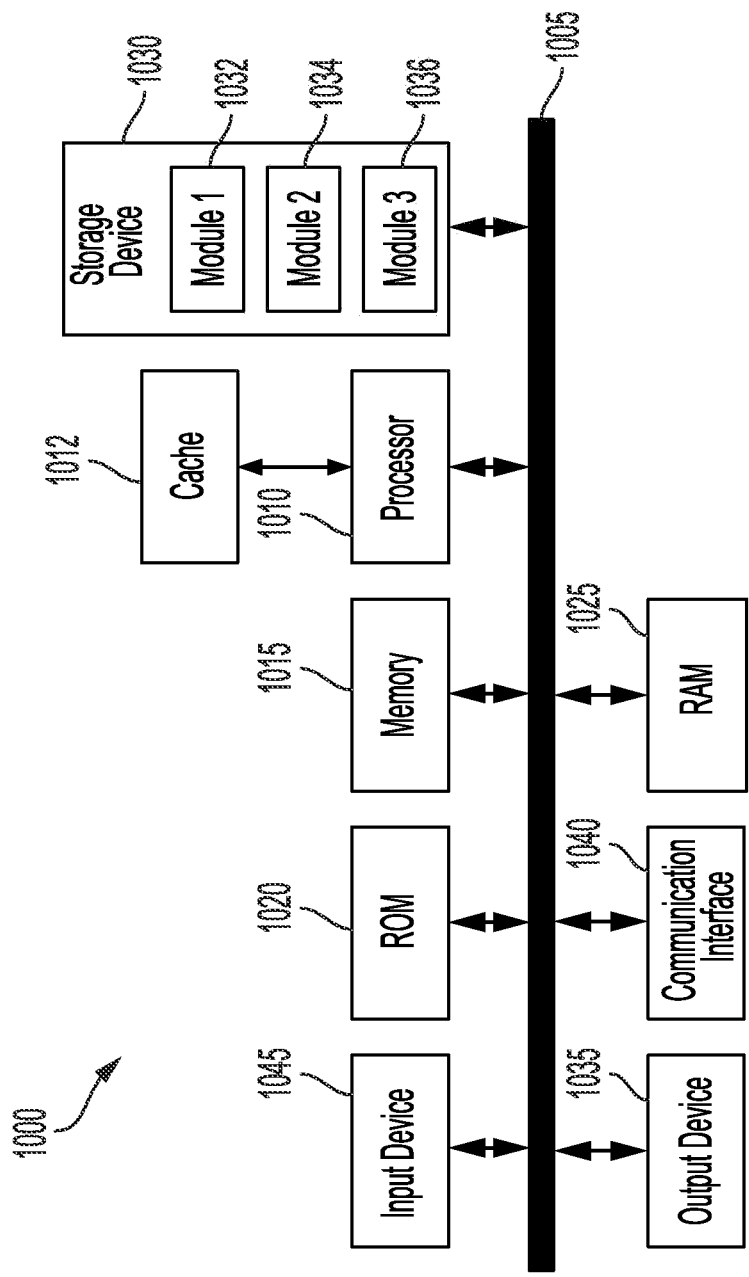
FIG. 10 shows an example of a computing system in accordance with some aspects of the present technology.

FIG. 10 shows an example of computing system 1000, which can be for example any computing device making up a tenant operator 302, 304 or a shared O-RU operator 303, or any component thereof in which the components of the system are in communication with each other using connection 1005. Connection 1005 can be a physical connection via a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache of high-speed memory 1012 connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. There is no restriction on operating on any particular hardware arrangement, and therefore the basic features here may easily be substituted for improved hardware or firmware arrangements as they are developed.

Storage device 1030 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Claim language reciting "at least one of" refers to at least one of a set and indicates that one member of the set or multiple members of the set satisfy the claim. For example, claim language reciting "at least one of A and B" means A, B, or A and B.

Illustrative examples of the disclosure include:

Aspect 1: A computer-implemented method comprising: committing a first partitioning configuration for a first tenant or slice operator to a shared resource configured by a shared resource operator, wherein the shared resource operator confirmed the first partitioning configuration is in accordance to a resource partitioning policy; receiving two or more sets of scheduling information from two or more respective schedulers operated by two or more respective individual tenant or slice operators including the first tenant or slice operator; and broadcasting messages associated with the scheduling information to user equipments (UEs).

Aspect 2: The computer-implemented method of Aspect 1, wherein each set of scheduling information is based on reported traffic and includes separate resource configuration and scheduling for channels including at least one of physical random-access channels, common paging channels, and dedicated channels.

Aspect 3: The computer-implemented method of any of Aspects 1 to 2, the computer-implemented method further comprising: agreeing to a first set of physical random-access channels with the first tenant or slice operator and a second set of physical random-access channels with a second tenant or slice operator; and agreeing to a first set of common paging channels with the first tenant or slice operator and a second set of common paging channels with the second tenant or slice operator.

Aspect 4: The computer-implemented method of any of Aspects 1 to 3, the computer-implemented method further comprising: allocating a unique identifier to each operator of the shared resource operator and the two or more respective individual tenant or slice operators, wherein each operator is required to use the unique identifier in further refining a particular set of the channels.

Aspect 5: The computer-implemented method of any of Aspects 1 to 4, wherein each operator is required to use the unique identifier in further refining identification of sub-frame numbers in which to broadcast paging frames, wherein each operator can use their unique identifier in a modified paging frame algorithms to determine which subset of paging frames operated using resources of the shared resource are available for use by each operator.

Aspect 6: The computer-implemented method of any of Aspects 1 to 5, wherein the allocation of paging opportunities to each of the two or more individual tenant or slice operators is opaque to a user equipment (UE), and wherein the UE continues to use a 3GPP defined algorithm to calculate necessary paging frames to decode.

Aspect 7: The computer-implemented method of any of Aspects 1 to 6, the computer-implemented method further comprising: confirming that a set of partitioning configurations including the first partitioning configuration based on unique identifiers between each operator of the two or more respective individual tenant or slice operators is in accordance to the resource partitioning policy; and committing the set of partitioning configurations, wherein each operator seeks to separately configure the shared resource by only using respective allocated identifiers.

Aspect 8: The computer-implemented method of any of Aspects 1 to 7, wherein the shared resource is a shared open radio unit (O-RU).

Aspect 9: The computer-implemented method of any of Aspects 1 to 8, the computer-implemented method further comprising: based on the agreed upon set of resource partitioning rules, partitioning resources to allocate mutually exclusive Bandwidth Parts (BWPs) to each tenant operator.

Aspect 10: The computer-implemented method of any of Aspects 1 to 9, wherein the shared resource operator operates or enables a third-party operator to operate a fronthaul link that supports transmission of common downlink channels including at least one of a Primary Synchronization Signal (PSS) channel, a Synchronization Signal Block (SSB) channel, and a Packet Broadcast Control Channel (PBCCH).

Aspect 11: The computer-implemented method of any of Aspects 1 to 10, wherein, when operating a fronthaul network, Physical Resource Blocks (PRBs) are defined to enable each operator to configure beginning and end parameters used to identify the PRBs to ensure use of mutually exclusive data sections over the fronthaul network.

Aspect 12: The computer-implemented method of any of Aspects 1 to 11, wherein allocating sections dynamically range from sub 5 MHz to more than 20 MHz.

Aspect 13: The computer-implemented method of any of Aspects 1 to 12, the computer-implemented method further comprising: maintaining timing synchronization during periods of time when PRB resources have not been allocated between a first tenant or slice and a second tenant or slice, wherein each of the first tenant or slice and the second tenant or slice runs their own parallel timing to ensure a seamless switchover.

Aspect 14: A system for scheduling radio transmissions across multiple operators, comprising: a storage configured to store instructions; a processor configured to execute the instructions and cause the processor to: commit a first partitioning configuration for a first tenant or slice operator to a shared resource configured by a shared resource operator, wherein the shared resource operator confirmed the first partitioning configuration is in accordance to a resource partitioning policy, receive two or more sets of scheduling information from two or more respective schedulers operated by two or more respective individual tenant or slice operators including the first tenant or slice operator, and broadcast messages associated with the scheduling information to user equipments (UEs).

Aspect 15: The system of Aspect 14, wherein each set of scheduling information is based on reported traffic and includes separate resource configuration and scheduling for channels including at least one of physical random-access channels, common paging channels, and dedicated channels.

Aspect 16: The system of any of Aspects 14 to 15, wherein the processor is configured to execute the instructions and cause the processor to: agree to a first set of physical random-access channels with the first tenant or slice operator and a second set of physical random-access channels with a second tenant or slice operator; and agree to a first set of common paging channels with the first tenant or slice operator and a second set of common paging channels with the second tenant or slice operator.

Aspect 17: The system of any of Aspects 14 to 16, wherein the processor is configured to execute the instructions and cause the processor to: allocate a unique identifier to each operator of the shared resource operator and the two or more respective individual tenant or slice operators, wherein each operator is required to use the unique identifier in further refining a particular set of the channels, and and each operator is required to use the unique identifier in further refining a particular set of the channels, and.

Aspect 18: The system of any of Aspects 14 to 17, wherein each operator is required to use the unique identifier in further refining identification of sub-frame numbers in which to broadcast paging frames and each operator is required to use the unique identifier in further refining identification of sub-frame numbers in which to broadcast paging frames.

Aspect 19: The system of any of Aspects 14 to 18, wherein the allocation of paging opportunities to each of the two or more individual tenant or slice operators is opaque to a user equipment (UE), and and the allocation of paging opportunities to each of the two or more individual tenant or slice operators is opaque to a user equipment (UE), and.

Aspect 20: The system of any of Aspects 14 to 19, wherein the processor is configured to execute the instructions and cause the processor to: confirm that a set of partitioning configurations including the first partitioning configuration based on unique identifiers between each operator of the two or more respective individual tenant or slice operators is in accordance to the resource partitioning policy; and commit the set of partitioning configurations, wherein each operator seeks to separately configure the shared resource by only using respective allocated identifiers.

Aspect 21: The system of any of Aspects 14 to 20, wherein the shared resource is a shared open radio unit (O-RU).

Aspect 22: The system of any of Aspects 14 to 21, wherein the processor is configured to execute the instructions and cause the processor to: based on the agreed upon set of resource partitioning rules, partition resources to allocate mutually exclusive Bandwidth Parts (BWPs) to each tenant operator.

Aspect 23: The system of any of Aspects 14 to 22, wherein the shared resource operator operates or enables a third-party operator to operate a fronthaul link that supports transmission of common downlink channels including at least one of a Primary Synchronization Signal (PSS) channel, a Synchronization Signal Block (SSB) channel, and a Packet Broadcast Control Channel (PBCCH).

Aspect 24: The system of any of Aspects 14 to 23, wherein, when operating a fronthaul network, Physical Resource Blocks (PRBs) are defined to enable each operator to configure beginning and end parameters used to identify the PRBs to ensure use of mutually exclusive data sections over the fronthaul network.

Aspect 25: The system of any of Aspects 14 to 24, wherein allocating sections dynamically range from sub 5 MHz to more than 20 MHz.

Aspect 26: The system of any of Aspects 14 to 25, wherein the processor is configured to execute the instructions and cause the processor to: maintain timing synchronization during periods of time when PRB resources have not been allocated between a first tenant or slice and a second tenant or slice, wherein each of the first tenant or slice and the second tenant or slice runs their own parallel timing to ensure a seamless switchover.

Aspect 27: A non-transitory computer readable medium comprising instructions, the instructions, when executed by a computing system, cause the computing system to: commit a first partitioning configuration for a first tenant or slice operator to a shared resource configured by a shared resource operator, wherein the shared resource operator confirmed the first partitioning configuration is in accordance to a resource partitioning policy; receive two or more sets of scheduling information from two or more respective schedulers operated by two or more respective individual tenant or slice operators including the first tenant or slice operator; and broadcast messages associated with the scheduling information to user equipments (UEs).

Aspect 28: The computer readable medium of Aspect 27, each set of scheduling information is based on reported traffic and includes separate resource configuration and scheduling for channels including at least one of physical random-access channels, common paging channels, and dedicated channels.

Aspect 29: The computer readable medium of any of Aspects 27 to 28, wherein the computer readable medium further comprises instructions that, when executed by the computing system, cause the computing system to: agree to a first set of physical random-access channels with the first tenant or slice operator and a second set of physical random-access channels with a second tenant or slice operator; and agree to a first set of common paging channels with the first tenant or slice operator and a second set of common paging channels with the second tenant or slice operator.

Aspect 30: The computer readable medium of any of Aspects 27 to 29, wherein the computer readable medium further comprises instructions that, when executed by the computing system, cause the computing system to: allocate a unique identifier to each operator of the shared resource operator and the two or more respective individual tenant or slice operators, wherein each operator is required to use the unique identifier in further refining a particular set of the channels, and and each operator is required to use the unique identifier in further refining a particular set of the channels, and.

Aspect 31: The computer readable medium of any of Aspects 27 to 30, each operator is required to use the unique identifier in further refining identification of sub-frame numbers in which to broadcast paging frames and each operator is required to use the unique identifier in further refining identification of sub-frame numbers in which to broadcast paging frames.

Aspect 32: The computer readable medium of any of Aspects 27 to 31, the allocation of paging opportunities to each of the two or more individual tenant or slice operators is opaque to a user equipment (UE), and and the allocation of paging opportunities to each of the two or more individual tenant or slice operators is opaque to a user equipment (UE), and.

Aspect 33: The computer readable medium of any of Aspects 27 to 32, wherein the computer readable medium further comprises instructions that, when executed by the computing system, cause the computing system to: confirm that a set of partitioning configurations including the first partitioning configuration based on unique identifiers between each operator of the two or more respective individual tenant or slice operators is in accordance to the resource partitioning policy; and commit the set of partitioning configurations, wherein each operator seeks to separately configure the shared resource by only using respective allocated identifiers.

Aspect 34: The computer readable medium of any of Aspects 27 to 33, the shared resource is a shared open radio unit (O-RU).

Aspect 35: The computer readable medium of any of Aspects 27 to 34, wherein the computer readable medium further comprises instructions that, when executed by the computing system, cause the computing system to: based on the agreed upon set of resource partitioning rules, partition resources to allocate mutually exclusive Bandwidth Parts (BWPs) to each tenant operator.

Aspect 36: The computer readable medium of any of Aspects 27 to 35, the shared resource operator operates or enables a third-party operator to operate a fronthaul link that supports transmission of common downlink channels including at least one of a Primary Synchronization Signal (PSS) channel, a Synchronization Signal Block (SSB) channel, and a Packet Broadcast Control Channel (PBCCH).

Aspect 37: The computer readable medium of any of Aspects 27 to 36, when operating a fronthaul network, Physical Resource Blocks (PRBs) are defined to enable each operator to configure beginning and end parameters used to identify the PRBs to ensure use of mutually exclusive data sections over the fronthaul network.

Aspect 38: The computer readable medium of any of Aspects 27 to 37, allocating sections dynamically range from sub 5 MHz to more than 20 MHz.

Aspect 39: The computer readable medium of any of Aspects 27 to 38, wherein the computer readable medium further comprises instructions that, when executed by the computing system, cause the computing system to: maintain timing synchronization during periods of time when PRB resources have not been allocated between a first tenant or slice and a second tenant or slice, wherein each of the first tenant or slice and the second tenant or slice runs their own parallel timing to ensure a seamless switchover.

What is claimed is:

1. A computer-implemented method comprising:
    committing a first partitioning configuration for a first tenant or slice operator to a shared resource configured by a shared resource operator, wherein the shared resource operator confirmed the first partitioning configuration is in accordance to a resource partitioning policy;
    receiving two or more sets of partitioned configuration information for a shared resource from two or more respective individual tenant or slice operators including the first tenant or slice operator;
    receiving two or more sets of scheduling information from two or more respective schedulers operated by two or more respective individual tenant or slice operators including the first tenant or slice operator;
    agreeing to a first set of physical random-access channels and a first set of common paging channels with the first tenant or slice operator and a second set of physical random-access channels and a second set of common paging channels with a second tenant or slice operator; and
    broadcasting messages associated with the two or more sets of scheduling information to user equipments (UEs).

2. The computer-implemented method of claim 1, wherein each set of scheduling information is based on reported traffic and includes separate resource configuration and scheduling for channels including at least one of physical random-access channels, common paging channels, and dedicated channels.

3. The computer-implemented method of claim 2, the computer-implemented method further comprising:
    allocating a unique identifier to each operator of the shared resource operator and the two or more respective individual tenant or slice operators, wherein each operator is required to use the unique identifier in further refining a particular set of the channels.

4. The computer-implemented method of claim 3, wherein each operator is required to use the unique identifier in further refining identification of sub-frame numbers in which to broadcast paging frames, wherein each operator can use their unique identifier in a modified paging frame algorithms to determine which subset of paging frames operated using resources of the shared resource are available for use by each operator.

5. The computer-implemented method of claim 4, wherein the allocation of paging opportunities to each of the two or more individual tenant or slice operators is opaque to a user equipment (UE), and wherein the UE continues to use a 3GPP defined algorithm to calculate necessary paging frames to decode.

6. The computer-implemented method of claim 1, the computer-implemented method further comprising:
    confirming that a set of partitioning configurations including the first partitioning configuration based on unique identifiers between each operator of the two or more respective individual tenant or slice operators is in accordance to the resource partitioning policy; and
    committing the set of partitioning configurations, wherein each operator seeks to separately configure the shared resource by only using respective allocated identifiers.

7. The computer-implemented method of claim 1, wherein the shared resource is a shared open radio unit (O-RU).

8. The computer-implemented method of claim 1, the computer-implemented method further comprising:
    based on the agreed upon set of resource partitioning rules, partitioning resources to allocate mutually exclusive Bandwidth Parts (BWPs) to each tenant operator.

9. The computer-implemented method of claim 1, wherein the shared resource operator operates or enables a third-party operator to operate a fronthaul link that supports transmission of common downlink channels including at least one of a Primary Synchronization Signal (PSS) channel, a Synchronization Signal Block (SSB) channel, and a Packet Broadcast Control Channel (PBCCH).

10. The computer-implemented method of claim 1, wherein, when operating a fronthaul network, Physical Resource Blocks (PRBs) are defined to enable each operator to configure beginning and end parameters used to identify the PRBs to ensure use of mutually exclusive data sections over the fronthaul network.

11. The computer-implemented method of claim 10, wherein allocating sections dynamically range from sub 5 MHz to more than 20 MHz.

12. The computer-implemented method of claim 10, the computer-implemented method further comprising:
    maintaining timing synchronization during periods of time when PRB resources have not been allocated between a first tenant or slice and a second tenant or slice, wherein each of the first tenant or slice and the second tenant or slice runs their own parallel timing to ensure a seamless switchover.

13. A system for scheduling radio transmissions across multiple operators, comprising:
    a storage configured to store instructions; and
    a processor configured to execute the instructions and cause the processor to:
        commit a first partitioning configuration for a first tenant or slice operator to a shared resource configured by a shared resource operator, wherein the shared resource operator confirmed the first partitioning configuration is in accordance to a resource partitioning policy;
        receive two or more sets of scheduling information from two or more respective schedulers operated by two or more respective individual tenant or slice operators including the first tenant or slice operator;
        agree to a first set of physical random-access channels and a first set of common paging channels with the first tenant or slice operator and a second set of physical random-access channels and a second set of common paging channels with a second tenant or slice operator; and
        broadcast messages associated with the scheduling information to user equipments (UEs).

14. The system of claim 13, wherein each set of scheduling information is based on reported traffic and includes separate resource configuration and scheduling for channels including at least one of physical random-access channels, common paging channels, and dedicated channels.

15. The system of claim 14, wherein the instructions further cause the processor to:

allocate a unique identifier to each operator of the shared resource operator and the two or more respective individual tenant or slice operators, wherein each operator is required to use the unique identifier in further refining a particular set of the channels.

16. The system of claim 13, wherein the instructions further cause the processor to:

confirm that a set of partitioning configurations including the first partitioning configuration based on unique identifiers between each operator of the two or more respective individual tenant or slice operators is in accordance to the resource partitioning policy; and commit the set of partitioning configurations, wherein each operator seeks to separately configure the shared resource by only using respective allocated identifiers.

17. The system of claim 13, wherein the shared resource is a shared open radio unit (O-RU).

18. A non-transitory computer readable medium comprising instructions, the instructions, when executed by a computing system, cause the computing system to:

commit a first partitioning configuration for a first tenant or slice operator to a shared resource configured by a shared resource operator, wherein the shared resource operator confirmed the first partitioning configuration is in accordance to a resource partitioning policy;

receive two or more sets of scheduling information from two or more respective schedulers operated by two or more respective individual tenant or slice operators including the first tenant or slice operator;

agree to a first set of physical random-access channels and a first set of common paging channels with the first tenant or slice operator and a second set of physical random-access channels and a second set of common paging channels with a second tenant or slice operator; and broadcast messages associated with the scheduling information to user equipments (UEs).

19. The non-transitory computer readable medium of claim 18, wherein each set of scheduling information is based on reported traffic and includes separate resource configuration and scheduling for channels including at least one of physical random-access channels, common paging channels, and dedicated channels.

20. The non-transitory computer readable medium of claim 18, wherein the instructions further cause the computing system to:

allocate a unique identifier to each operator of the shared resource operator and the two or more respective individual tenant or slice operators, wherein each operator is required to use the unique identifier in further refining a particular set of the channels.

* * * * *